United States Patent [19]
Obuchi et al.

[11] Patent Number: 5,937,005
[45] Date of Patent: Aug. 10, 1999

[54] ERROR RATE MEASUREMENT APPARATUS FOR A MOBILE RADIO COMMUNICATIONS SYSTEM

[75] Inventors: Kazuhisa Obuchi; Morihiko Minowa; Tokuro Kubo, all of Kawasaki, Japan

[73] Assignee: Fujitsu Limited, Kanagawa, Japan

[21] Appl. No.: 08/655,389

[22] Filed: May 30, 1996

[30] Foreign Application Priority Data

Aug. 22, 1995 [JP] Japan ..................... 7-213288

[51] Int. Cl.$^6$ ........................................ H04B 3/46
[52] U.S. Cl. .................... 375/224; 375/347; 375/349; 375/351; 455/67.3; 455/137; 455/226.1; 455/272; 371/5.1
[58] Field of Search .................. 375/200, 224, 375/227, 267, 347, 349; 455/67.3, 132, 137, 226.1, 226.3, 269, 272; 371/5.1, 5.2

[56] References Cited

U.S. PATENT DOCUMENTS

| | | | |
|---|---|---|---|
| 5,483,542 | 1/1996 | Nguyen | 371/5.1 |
| 5,563,909 | 10/1996 | Nakazawa | 375/224 |
| 5,732,089 | 3/1998 | Negi | 371/5.1 |

FOREIGN PATENT DOCUMENTS

| | | |
|---|---|---|
| 1297924 | 12/1989 | Japan . |
| 322554 | 10/1991 | Japan . |

*Primary Examiner*—Amanda Le
*Attorney, Agent, or Firm*—Helfgott & Karas, P.C.

[57] ABSTRACT

An error rate measurement apparatus for a mobile radio communications system, which quickly and accurately measures the error rate of received signals on a real-time basis with simple hardware. The apparatus is equipped with a plurality of receivers for receiving signals from a single transmission source with antennas spaced apart from each other. A bit comparator compares the received signals bit by bit and sends an error detection pulse signal to an error rate calculator if it has detected a bit error. The error rate calculator counts the number of error detection pulse signals sent from the bit comparator for a predetermined period. The error rate calculator then divides this pulse count by the number of incoming bits received during the predetermined period, and further divides the quotient by the number of reception signals that are compared by the bit comparator, thereby obtaining the error rate of the reception signal.

21 Claims, 30 Drawing Sheets

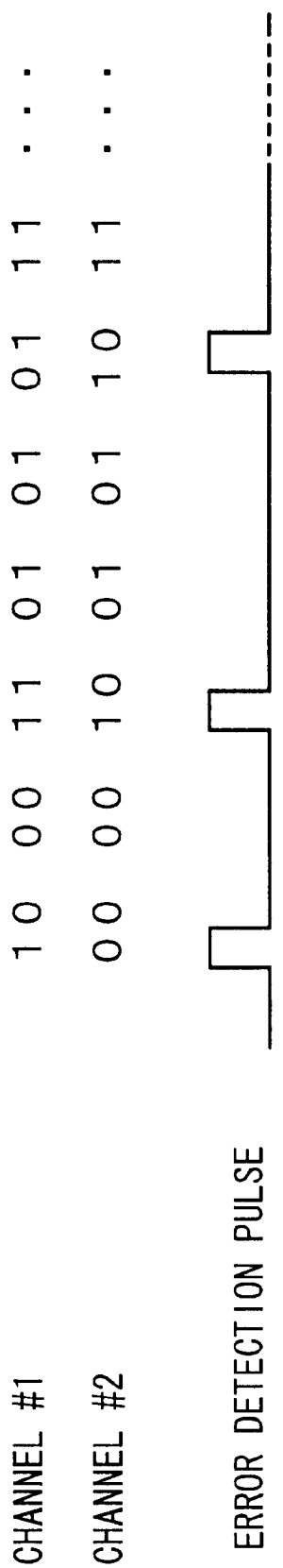

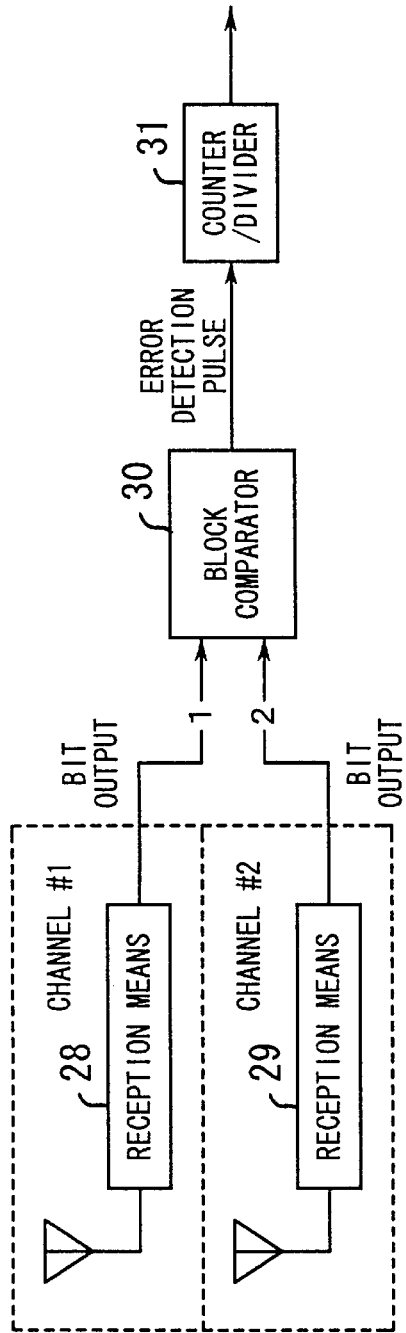
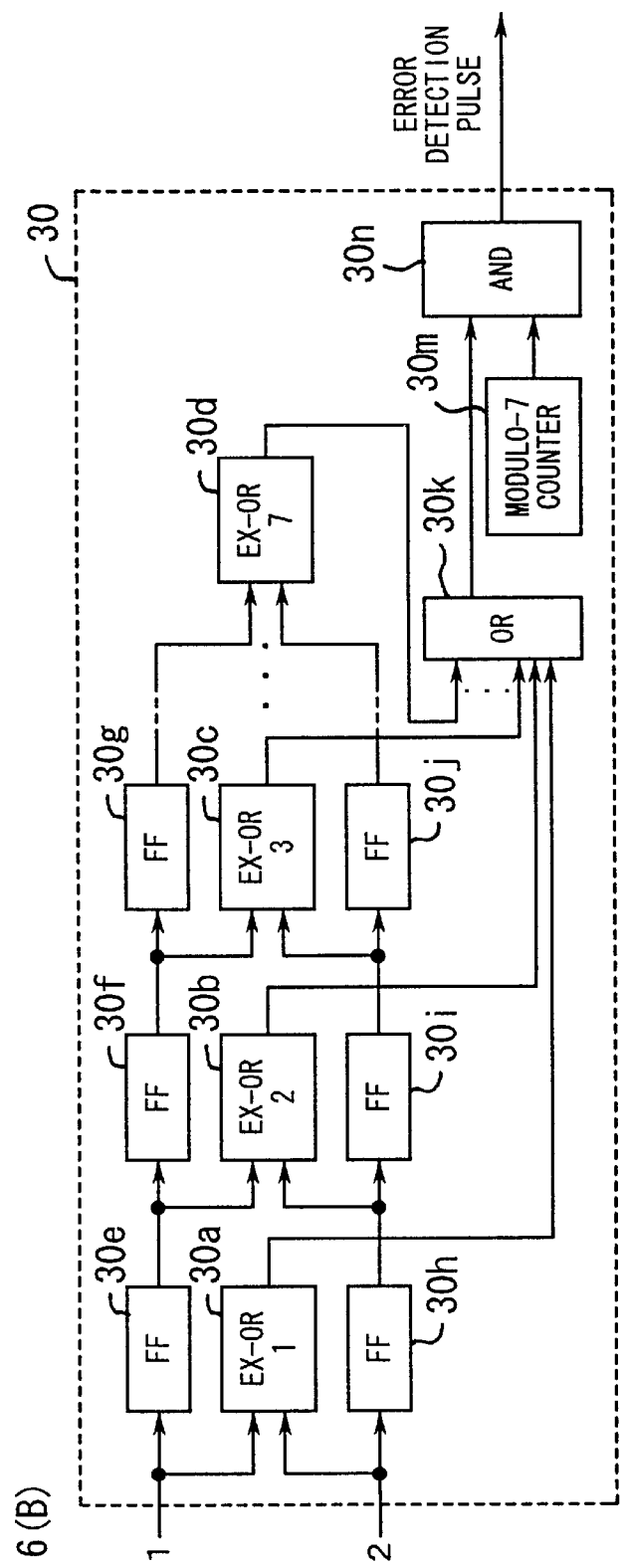
FIG. 6(A)
FIG. 6(B)

FIG. 11(A)

BIT COMPARISON (#1-#2)

RECEIVER #1    1 0 1 0 0 1 1 1 1 0 1 0 0 1 0 0 1 0 1 1 . . .
RECEIVER #2    1 0 1 0 0 1 1 1 1 0 1 0 0 1 1 0 0 1 0 1 1 . . .

ERROR DETECTION PULSE

FIG. 11(B)

BIT COMPARISON (#1-#3)

RECEIVER #1    1 0 1 0 0 1 1 1 1 0 1 0 1 0 0 1 0 0 1 0 1 1 . . .
RECEIVER #3    1 0 0 0 0 1 1 0 1 0 1 0 1 0 0 1 0 0 1 0 1 1 . . .

ERROR DETECTION PULSE

FIG. 11(C)

BIT COMPARISON (#2-#3)

RECEIVER #2    1 0 1 0 0 1 1 1 1 0 1 0 1 0 0 1 1 0 1 0 1 1 . . .
RECEIVER #3    1 0 0 0 0 1 1 0 1 0 1 0 1 0 0 1 0 0 1 0 1 1 . . .

ERROR DETECTION PULSE

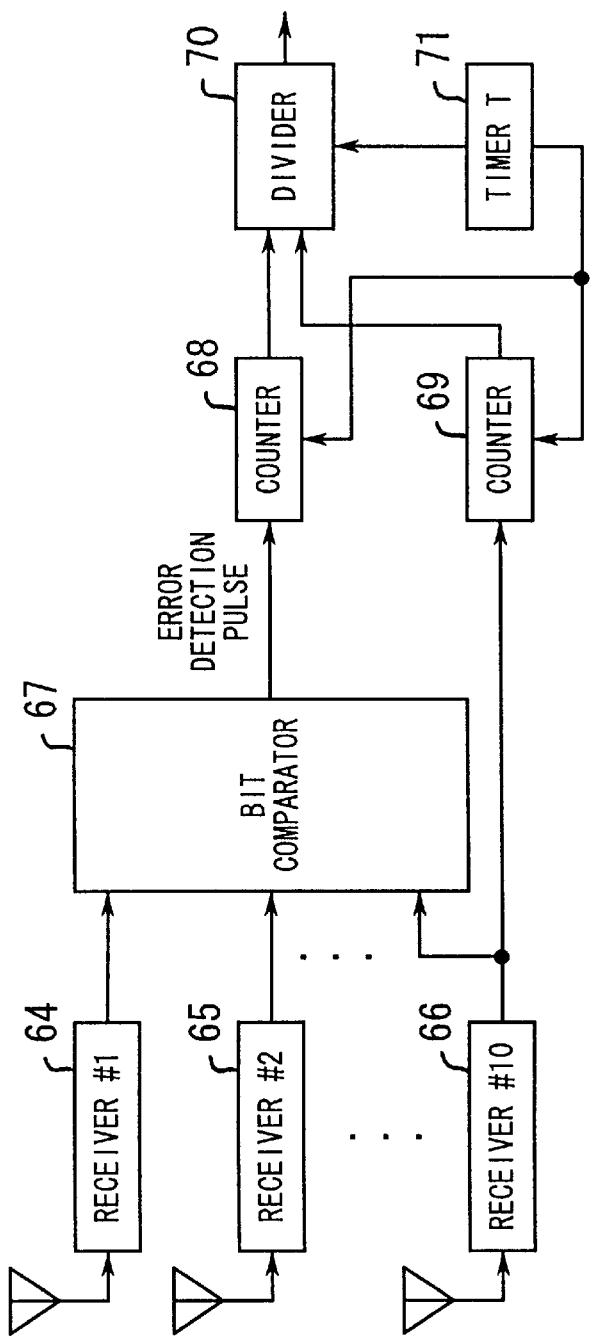
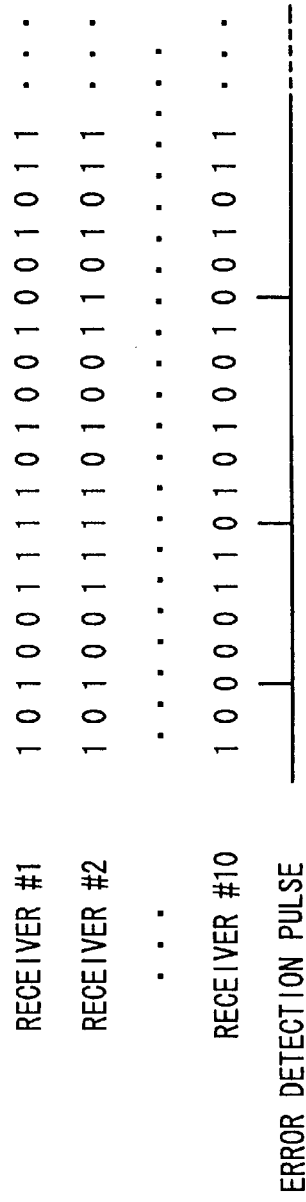
FIG. 15 (A)
FIG. 15 (B)

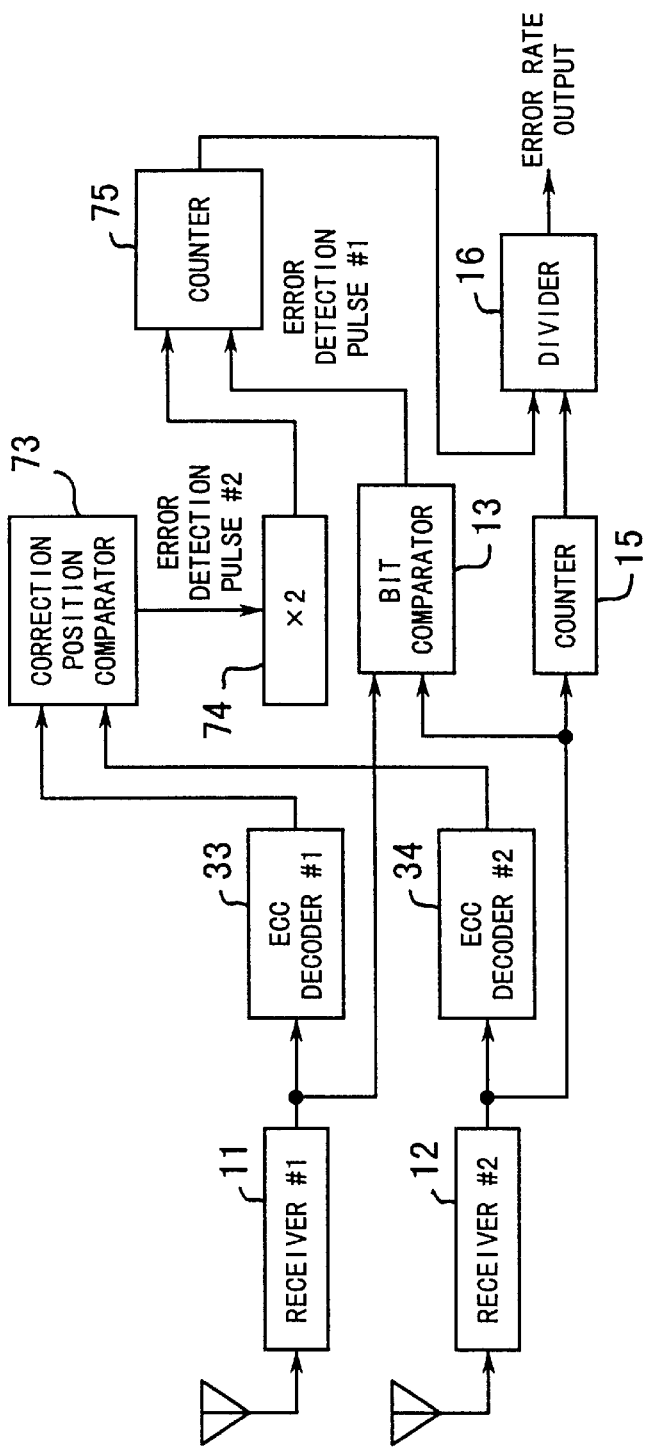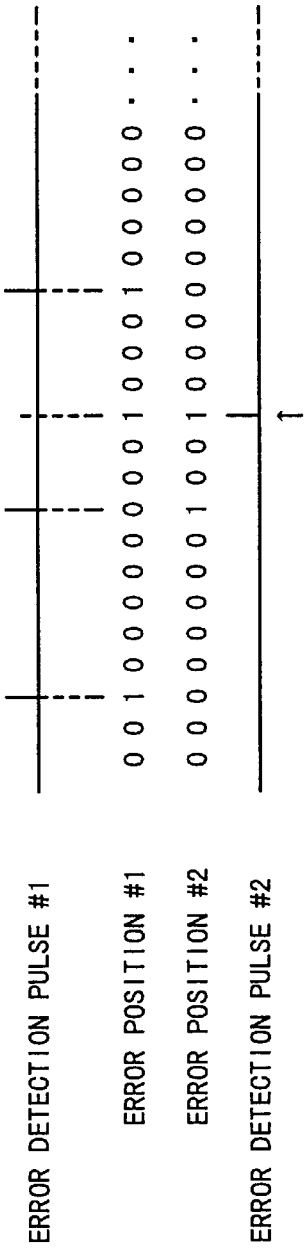
FIG. 16(A)
FIG. 16(B)

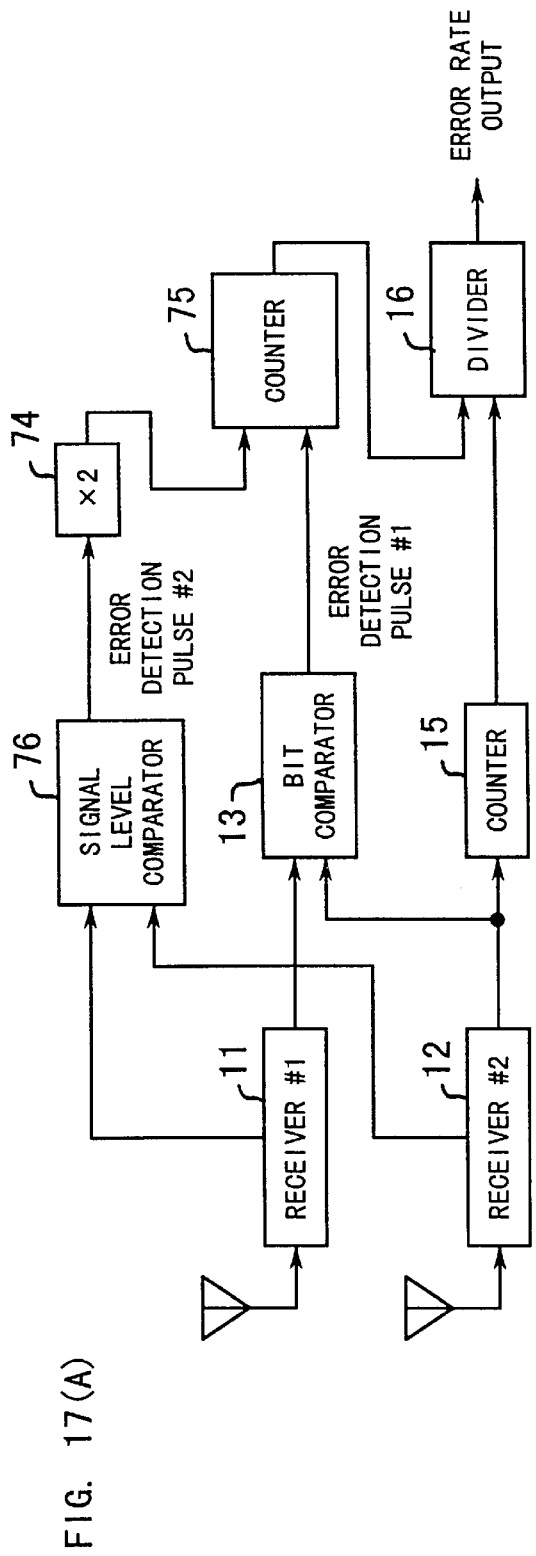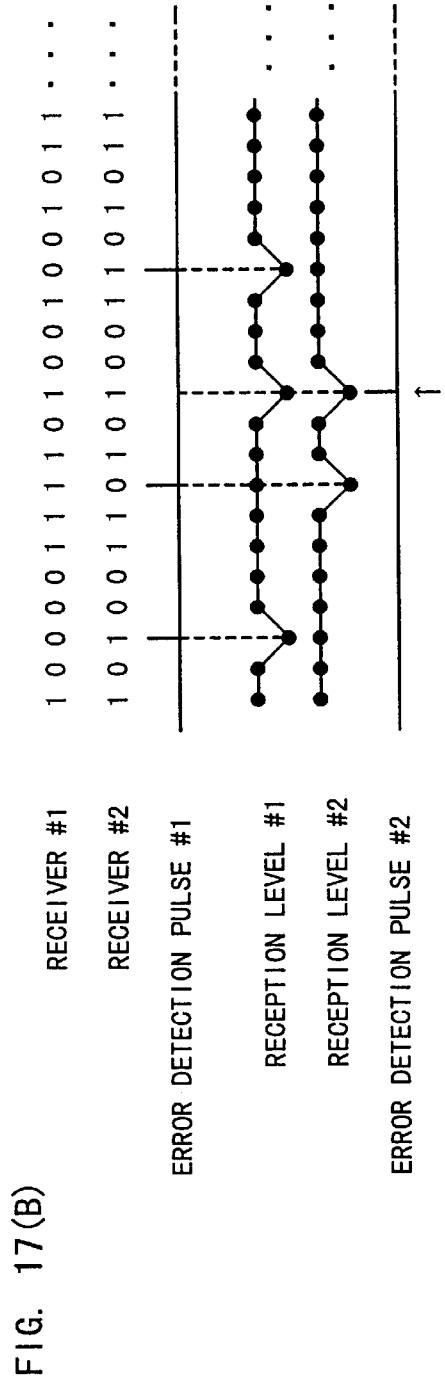
FIG. 17(A)
FIG. 17(B)

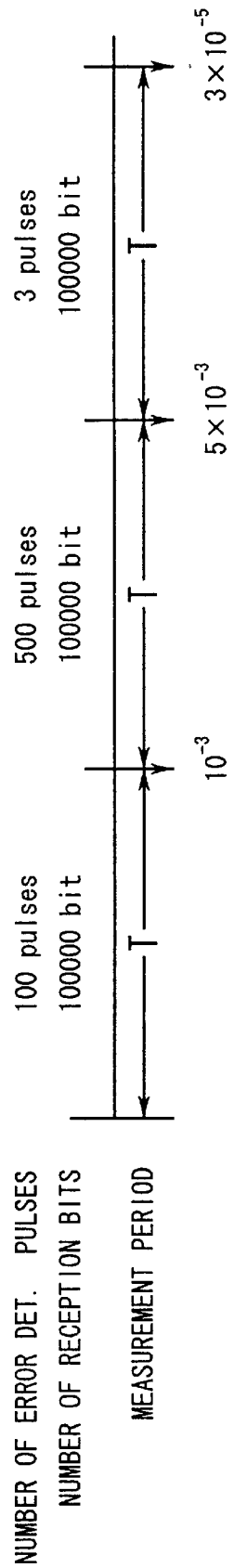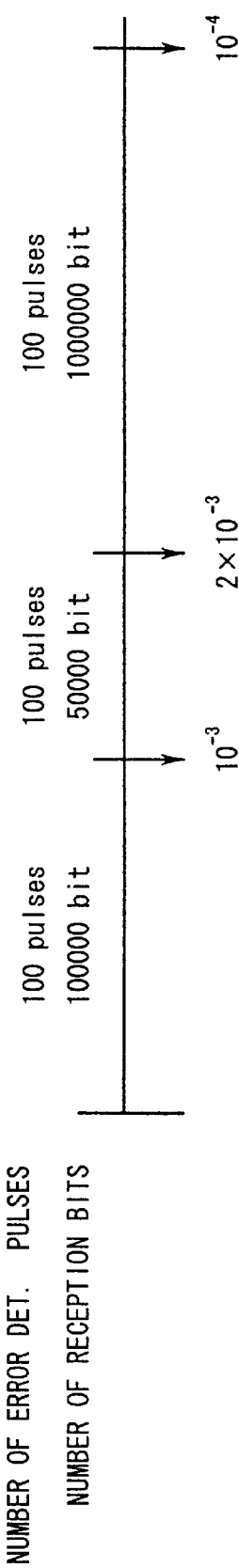
FIG. 23 (A)
FIG. 23 (B)

ERROR RATE MEASUREMENT APPARATUS FOR A MOBILE RADIO COMMUNICATIONS SYSTEM

BACKGROUND OF THE INVENTION

1. Field of the Invention

The present invention relates to an error rate measurement apparatus for a mobile radio communications system, and more specifically, to an error rate measurement apparatus for measuring an error rate of received signals on a real-time basis in a mobile radio communications system.

The measured error rate is used for transmission power control, for example, which manages the output power of a transmitter so that the error rate be maintained at a constant level.

2. Description of the Related Art

In designing radio communications equipment, pursuing a perfect error-free transmission will normally end up with high costs of receiver and transmitter devices, intolerable power consumption, or inefficient channel utilization. Rather, it is more practical and efficient to design a system so as to maintain some permissible error rate for each type of information to be transferred. Error rates in the order of $10^{-3}$ are commonly acceptable in voice communications and $10^{-5}$ in data communications.

In mobile radio communications, the error rate of reception signals will exhibit intensive fluctuation due to wide variations of transmission path conditions. To maintain the above-described permissible error rate, the output power of transmitters should be controlled according to the error rate of reception signals.

FIG. 29 shows an example of error rate characteristics when transmission power is varied, in which the term "BER" stands for "bit error rate" and the reference power level (i.e., 0 dB) is based on BER=$10^{-3}$. The scale of BER uses such expressions as "1e-05" implying "$10^{-5}$." Assume here that a voice communications system has such characteristics as FIG. 29. When its error rate is found to be as high as $10^{-2}$, for example, the communications system will raise the transmission power by 8 dB to reduce the error rate.

In conventional radio communications systems, their error rate is measured through a test process in which some known data is transferred over a vacant channel. That test data is previously agreed upon by both the transmitter and receiver. The error rate is then obtained by examining the received signals. This method, however, fully occupies one channel for measurement in addition to the one for main communication purposes, and the channel utilization factor will thus deteriorate.

To solve this problem, another error rate measurement system is proposed in Japanese Patent Laid-open Publication No. 1-297924 (1989). In this proposal, a particular bit pattern for frame synchronization, which is inserted in each channel data signal, serves as a known test data for measurement.

To solve the same problem, still another measurement system is disclosed in Japanese Patent Laid-open Publication No. 3-222554 (1991), which system estimates the error rate by measuring the signal levels and phase shift of reception signals.

The former prior-art measurement system, however, has a problem with its measurement cycle time. To yield a reliable and confident result in terms of statistical analysis, one hundred or more faulty bit samples have to be collected. Since the frame synchronization pattern used in the former measurement system provides only a small population, the measurement should be done over many transmission frames. Consequently, it takes much time to obtain a reliable measurement result.

On the other hand, the latter prior-art measurement system has an accuracy problem by nature. In addition, it should handle analog values that will require much processing power to perform enormous and complicated computation.

Code division multiple access (CDMA) has been of major interest for future applications in mobile communications, since it provides enough strength against frequency-selective fading by using a wide-spread frequency range for signal transmission. In a radio communications system with this CDMA method, the error rate of reception signals will directly affect its channel capacity as shown in FIG. 30. Here, the term "channel capacity" denotes the number of communication channels available in each unit of coverage area, or a cell. More specifically, the FIG. 30 indicates that the bit error rate of $10^{-3}$ permits concurrent use of 500 channels in the same cell, while the bit error rate of $10^{-4}$ only allows 120 channels. As such, in the CDMA mobile communications, the bit error rate and channel capacity are so closely related to each other that a quick and accurate error rate measurement is seriously demanded.

SUMMARY OF THE INVENTION

Taking the above into consideration, an object of the present invention is to provide an error rate measurement apparatus for a mobile radio communications system, particularly allowing a quick and accurate measurement of the error rate of received signals on a real-time basis with simple hardware.

To accomplish the above object, according to the present invention, there is provided an error rate measurement apparatus for detecting an error rate of received signals on a real-time basis in a mobile radio communications system. The apparatus comprises a plurality of reception means for receiving signals from a single transmission source with antennas spaced apart from each other, comparison means for making a comparison of reception signals received by the plurality of reception means, and error rate calculation means for obtaining an error rate from results of the comparison made by the comparison means.

To accomplish the above object, there is provided another error rate measurement apparatus for detecting an error rate of signals received via multiple propagation paths on a real-time basis in a spread-spectrum mobile radio communications system. The apparatus comprises a plurality of despreading means for despreading a reception signal, a plurality of delaying means for delaying respective outputs of the plurality of despreading means, combining means for combining respective outputs of the plurality of delaying means, comparison means for making a comparison of the respective outputs of the plurality of delaying means, and error rate calculation means for obtaining an error rate from a result of the comparison performed by the comparison means.

To accomplish the above object, there is provided still another error rate measurement apparatus for detecting an error rate of signals received via multiple propagation paths in a time diversity mobile radio communications system where the signals are transmitted at two instants separated by a prescribed time. The apparatus comprises delaying means for delaying a reception signal by the prescribed time to produce a delayed reception signal, diversity combining means for combining the reception signal and the delayed reception signal according to a time diversity method, comparison means for making a comparison between the reception signal and the delayed reception signal, and error rate calculation means for obtaining an error rate from a result of the comparison performed by the comparison means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram explaining the symbol error rate measurement;

FIG. 6(A) is a diagram showing a total structural arrangement for measurement of a block error rate;

FIG. 6(B) is a diagram showing a part of the structural arrangement for measurement of the block error rate;

FIGS. 11(A)–11(C) are diagrams showing detected pulse outputs in the third embodiment;

FIG. 15(A) is a diagram showing the structure of a fifth embodiment;

FIG. 15(B) is a diagram exemplifying a signal sequence in the structure shown in FIG. 15(A);

FIG. 16(A) is a diagram showing the structure of a sixth embodiment;

FIG. 16(B) is a diagram exemplifying a signal sequence in the structure shown in FIG. 16(A);

FIG. 17(A) is a diagram showing a structural arrangement in which the error rate is calculated according to reception signal levels;

FIG. 17(B) is a diagram exemplifying a signal sequence in the structure shown in FIG. 17(A);

FIG. 23(A) is a diagram showing output timings of the error rate based on a first error rate measurement method;

FIG. 23(B) is a diagram showing output timings of the error rate based on a second error rate measurement method;

DESCRIPTION OF THE PREFERRED EMBODIMENTS

Figure 1:
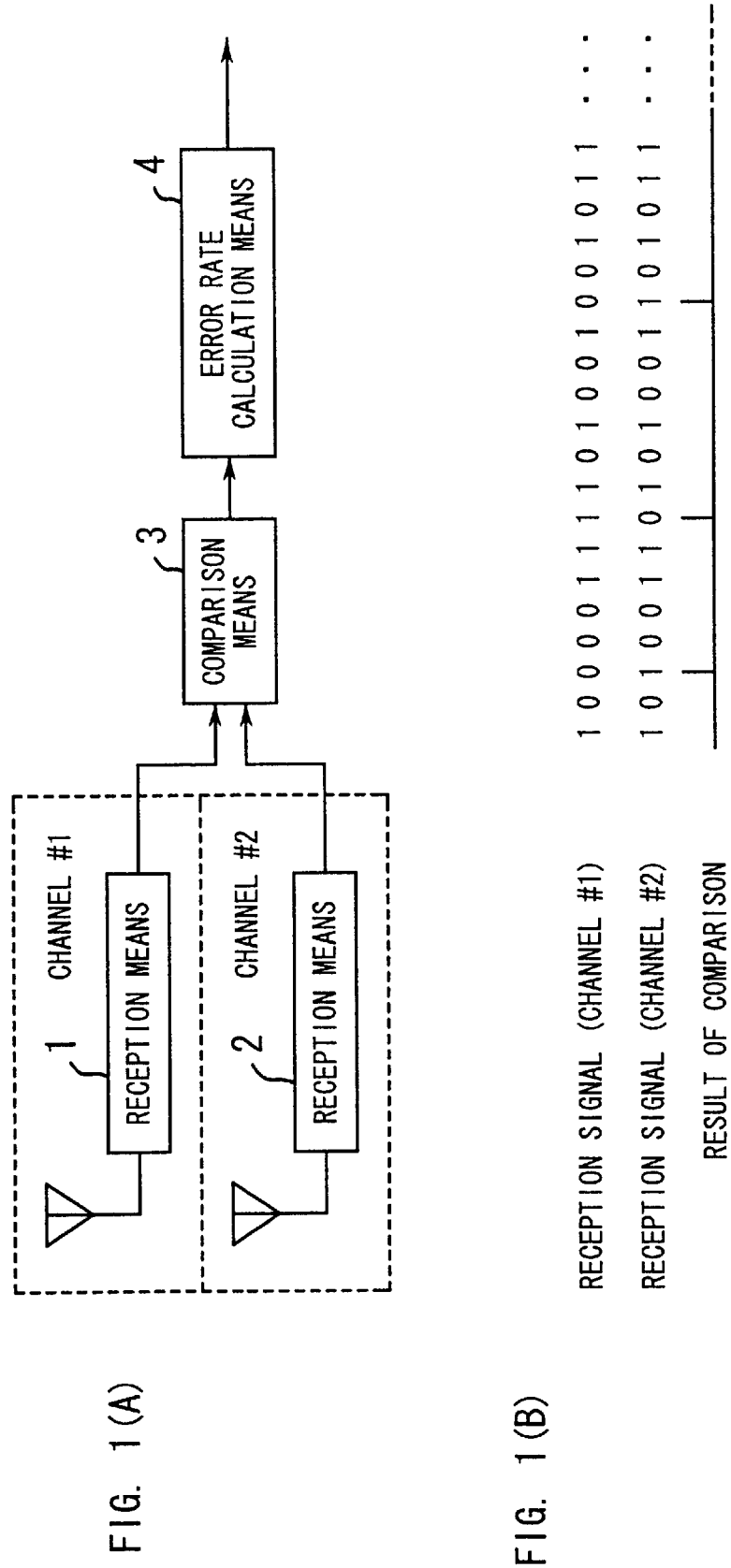
FIG. 1(A) is a conceptual view of the present invention.
FIG. 1(B) is a diagram exemplifying a signal sequence in the structure shown in FIG. 1(A)

At the outset, a first embodiment of the present invention will be described below with reference to FIG. 1(A). The first embodiment comprises a plurality of reception means 1 and 2, comparison means 3, and error rate calculation means 4. The reception means 1 and 2 receive a transmission signal originated from the same source with their respective antennas that are spaced apart. As will be described later on, those reception means and antennas also form a plurality of spatial diversity channels. Supplied with reception signals from the plurality of reception means 1 and 2, the comparison means 3 compares these signals with each other. The error rate calculation means 4 calculates the error rate based on the result of the comparison by the comparison means 3.

Here, it is assumed that the reception means 1 and 2 in the above-described arrangement have received signals as shown in FIG. 1(B), for example. The comparison means 3 compares two incoming bit streams in a bit-by-bit manner. As a result of this comparison, several bit errors are detected as represented in positive pulses in FIG. 1(B). Those error pulses indicating the bit errors are sent to the error rate calculation means 4. The error rate calculation means 4 counts the pulses for a predetermined period and divides the obtained count by the number of bits that have been received during the period. The quotient is further divided by the number of reception signals (i.e., by the number of incoming bit streams) compared by the comparison means 3 for comparison, thereby obtaining the error rate of the reception signals.

For two reception channels #1 and #2, the probability $P_{1+2}$ that two bits received by those channels are both erroneous is expressed as $$P_{1+2} = BERa \times BERb \quad (1)$$

where variables BERa and BERb represent the error rates of the two reception channels #1 and #2, respectively.

The probability $P_1$ that the bit received by the channel #1 is solely erroneous is expressed as $$P_1 = BERa \times (1-BERb) \qquad (2)$$

Likewise, the probability $P_2$ that the bit received by the channel #2 is solely erroneous is expressed as $$P_2 = (1-BERa) \times BERb \qquad (3)$$

Further, the probability $P_0$ that both bits are correct is expressed as $$P_0 = (1-BERa) \times (1-BERb) \qquad (4)$$

Since the comparison means 3 outputs a bit error in the case of Equation (2) or (3), the probability $P_{DET}$ that the comparison means 3 indicates a bit error is expressed as $$\begin{aligned} P_{DET} &= P_1 + P_2 \\ &= BERa \times (1-BERb) + (1-BERa) \times BERb \\ &= BERa + BERb - 2 \times BERa \times BERb \end{aligned} \qquad (5)$$

Since BERa and BERb are small enough in general, the production term (−2×BERa×BERb) is negligibly small. Then the following approximation (6) is obtained from Equation (5).

$$P_{DET} \approx BERa + BERb \qquad (6)$$

Therefore, the average error rate of reception signals is obtained by dividing the value $P_{DET}$ by the number of reception signals that are applied to the comparison means 3. The divisor in this case is two, since the comparison means 3 compares two incoming bit streams as shown in FIGS. 1(A) and 1(B).

As described above, the present invention uses multipath propagation signals that originate at the same source but travel on different paths to reach the same destination. During the travel on their respective paths, the multipath signals may suffer from different noise sources in different ways. By comparing such multipath signals, the error rate of the reception signal is measured in the present invention.

Because the scope of the comparison is not limited as is in the prior art using the frame synchronization pattern but covers the whole frame of the incoming signals, the error rate measurement can be finished in a short cycle time. Further, as the reception signals subject to the comparison are digital signals, a precise result can be obtained with a simple measurement device.

Figure 2:
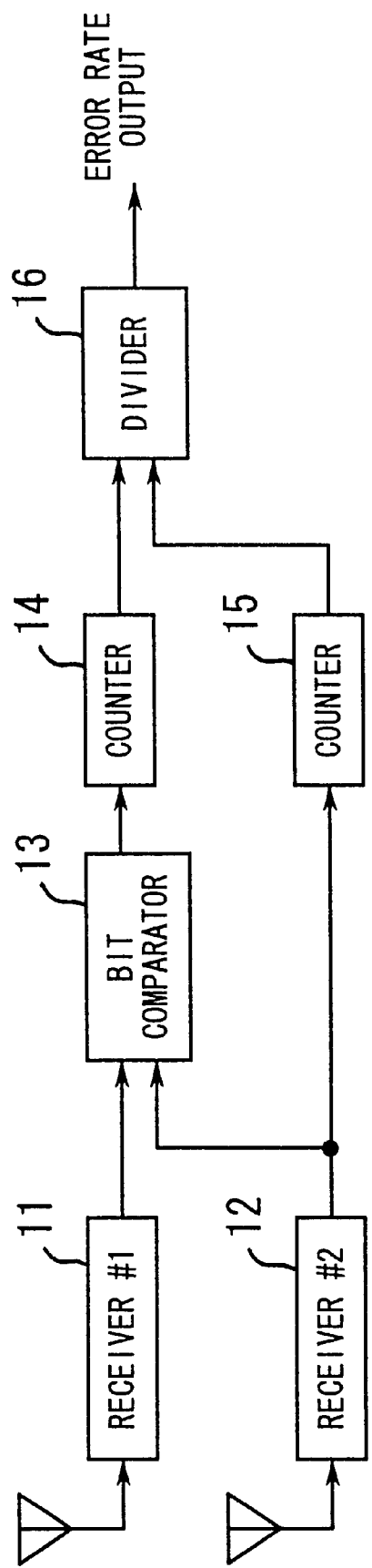
FIG. 2 is a diagram showing the structure of a first embodiment.

FIG. 2 is a block diagram showing the detailed structure of the first embodiment. The reception means 1 and 2 in FIG. 1 correspond to receivers 11 and 12 in FIG. 2. Similarly, the comparison means 3 corresponds to a bit comparator 13 and the error rate calculation means 4 to counters 14 and 15 and a divider 16.

The receivers 11 and 12 shown in FIG. 2 receive radio waves, serving as part of a two-channel space diversity receiver system. The bit comparator 13 is an exclusive OR gate to make a bit-to-bit comparison between two reception signals received by the receivers 11 and 12. When the two signals show different values, an error detection pulse is generated and sent to the counter 14. The counter 14 counts the error detection pulses sent from the bit comparator 13, while the other counter 15 counts the number of bits that have been received as the reception signal. The divider 16 divides the count value of the counter 14 by that of the counter 15, and further divides the quotient by two (i.e., the number of reception signals compared by the bit comparator 13), thus obtaining the average error rate. The error rate obtained in this way is a bit error rate.

Figure 3:
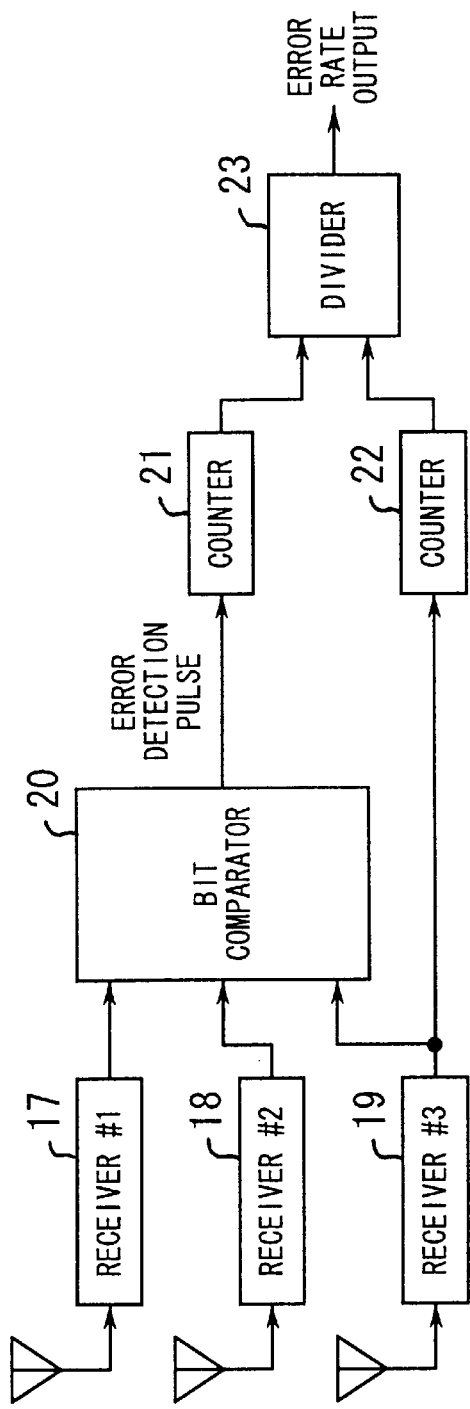
FIG. 3(A) is a diagram showing the structure comprising three diversity channel receivers.
FIG. 3(B) is a diagram exemplifying a signal sequence in the structure shown in FIG. 3(A)
Figure 3:
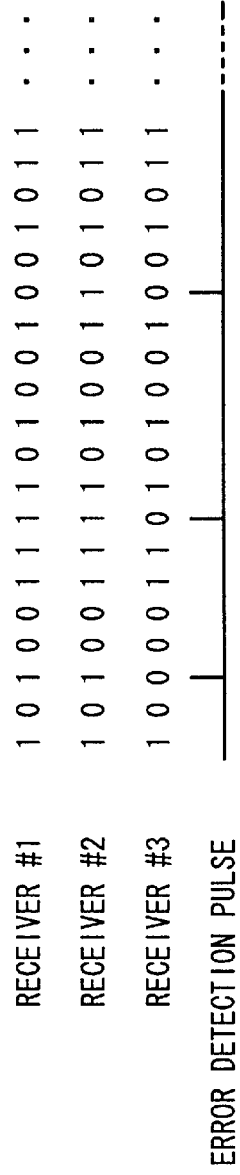

Although the structure presented in the first embodiment is a two-channel diversity receiver, it can be expanded to three-channel or more. FIG. 3(A) shows this expanded structure, in which three receivers 17–19 serve as part of a three-channel space diversity receiver system. A bit comparator 20 makes a bit-to-bit comparison among three reception signals received by the receivers 17–19. When the three signals do not agree, an error detection pulse is sent to the counter 21 as shown in FIG. 3(B). The counter 21 counts the error detection pulses sent from the bit comparator 20, while the other counter 22 counts the number of bits that have been received as the reception signal. The divider 23 divides the count value of the counter 21 by that of the counter 22, and further divides the quotient by three (i.e., the number of reception signals compared by the bit comparator 20), thereby obtaining the average error rate.

While the above-described two cases presented how to calculate a bit error rate, the following description will show two more variations of the first embodiment which are configured to measure a symbol error rate or block error rate.

Figure 4A:
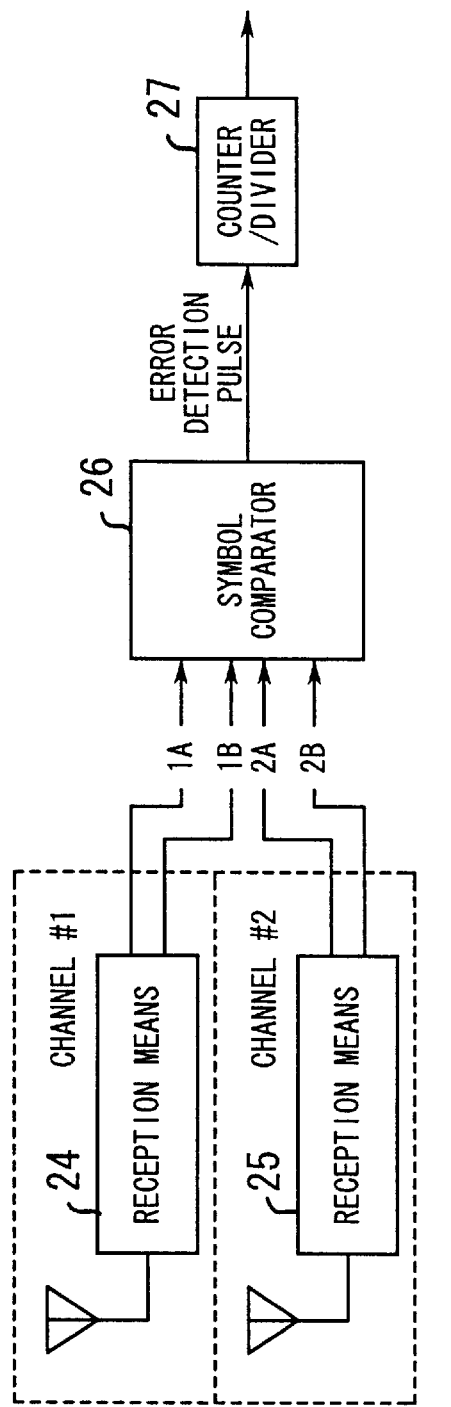
FIG. 4(A) is a diagram showing a total structural arrangement for measurement of a symbol error rate.
Figure 4B:
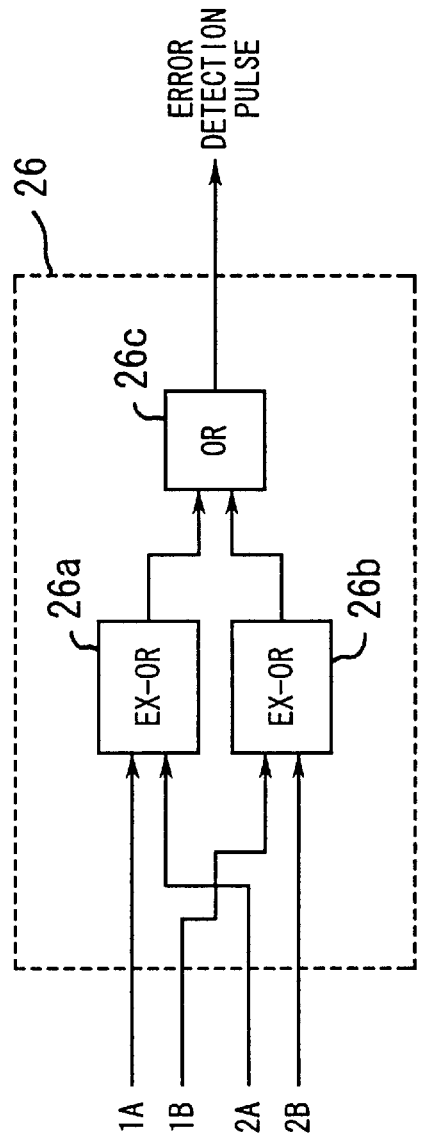
FIG. 4(B) is a diagram showing a part of the structural arrangement for measurement of the symbol error rate.
Figure 7:
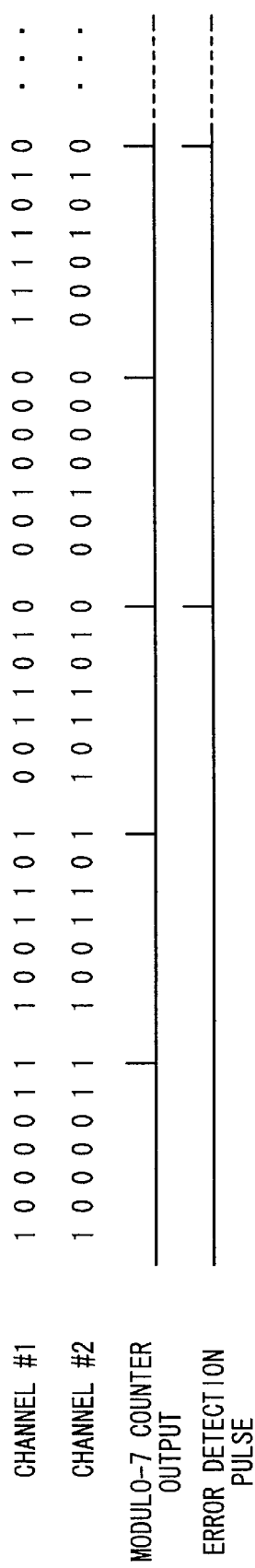
FIG. 7 is a diagram explaining the block error rate measurement.

FIGS. 4(A) and 4(B) illustrate a structural arrangement for measurement of a symbol error rate, where the radio transmission signal carries 2-bit per symbol by using a quadrature phase shift keying (QPSK) modulation technique, for example.

In FIG. 4(A), receivers 24 and 25 receive such symbols for their respective channels. In the reception channel #1, the receiver 24 outputs two bits 1A and 1B in parallel to a symbol comparator 26, and similarly in the reception channel #2, the receiver 25 outputs two bits 2A and 2B to the symbol comparator 26.

The symbol comparator 26 consists of some logic gates as shown in FIG. 4(B). An exclusive OR gate 26a compares the bits 1A and 2A, and another exclusive OR gate 26b the bits 1B and 2B. These exclusive OR gates 26a–26b detect inconsistency of their respective input bits and send it to an OR gate 26c, thus indicating a symbol error. As shown in FIG. 5, the symbol error detected by either or both of them will appear at the output of the OR gate 26c as a single error detection pulse.

A counter/divider 27 counts the error detection pulses from the symbol comparator 26 and divides the count value by the number of received symbols. The counter/divider 27 further divides the quotient by two (i.e., the number of reception signals compared by the symbol comparator 26), thus obtaining the average symbol error rate.

FIG. 6(A) shows a structural arrangement for measuring a block error rate, where each block consists of 7 bits.

Receivers 28 and 29 in the respective reception channels output received block signals serially to a block comparator 30. In order to compare two sets of 7-bit blocks, the block comparator 30 employs seven exclusive OR gates 30a–30d, six flip-flops 30e–30g for the reception channel #1, and six flip-flops 30h–30j for the reception channel #2, as shown in FIG. 6(B). When any of the seven bit-pairs indicates inconsistency, an OR gate 30k outputs an error pulse signal.

On the other hand, a modulo-7 counter 30m counts the number of incoming bits of the reception signal and outputs a pulse signal at every seven bits, thereby activating an AND gate 30n. As a result, the error pulse signals from the OR gate 30k are sampled by this counter output signal and outputted as an error detection pulse. In other words, the reception signals for one block (i.e., seven bits) are verified by the exclusive OR gates 30a–30d at a time and the result is outputted as an error detection pulse. Note that even a single bit error is treated as an error of the block as a whole.

A counter/divider 31 counts the error detection pulses from the block comparator 30 and divides the count by the number of received blocks. The counter/divider 31 further divides the quotient by two (i.e., the number of reception signals subjected to the block comparator 30), thus obtaining the average block error rate.

Figure 8:
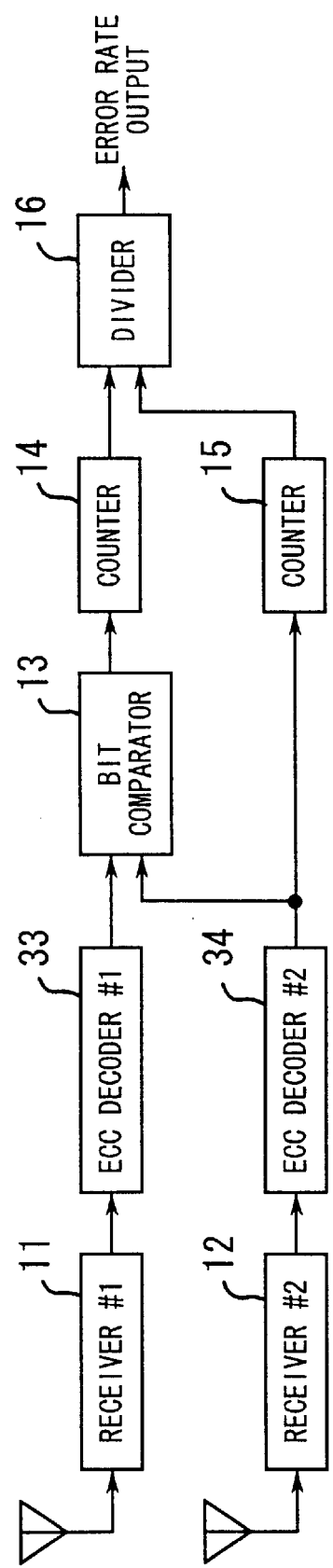
FIG. 8 is a diagram showing the structure of a second embodiment.

Next, a second embodiment of the present invention will be described below, with reference to FIG. 8 to show its structure. Since this second embodiment has basically the same structure as that of the first embodiment, the following description will focus on its distinctive points, while maintaining consistent reference numerals for the common elements.

In the second embodiment, error correction code (ECC) decoders 33 and 34 are disposed next to the receivers 11 and 12, respectively. Therefore, the bit comparator 13 will verify each bit of the reception signals after error correction.

In the case that the reception channels have ECC decoders, the error rate should be measured by observing the reception signals after the error correction. The structure in FIG. 6(A) is based on this concept.

Although this second embodiment has two-channel reception channels, it is also possible to arrange it for having three or more reception channels. In that case, the outputs of the expanded reception channels will be all applied to the same bit comparator 13 for testing their consistency at a time.

Figure 9:
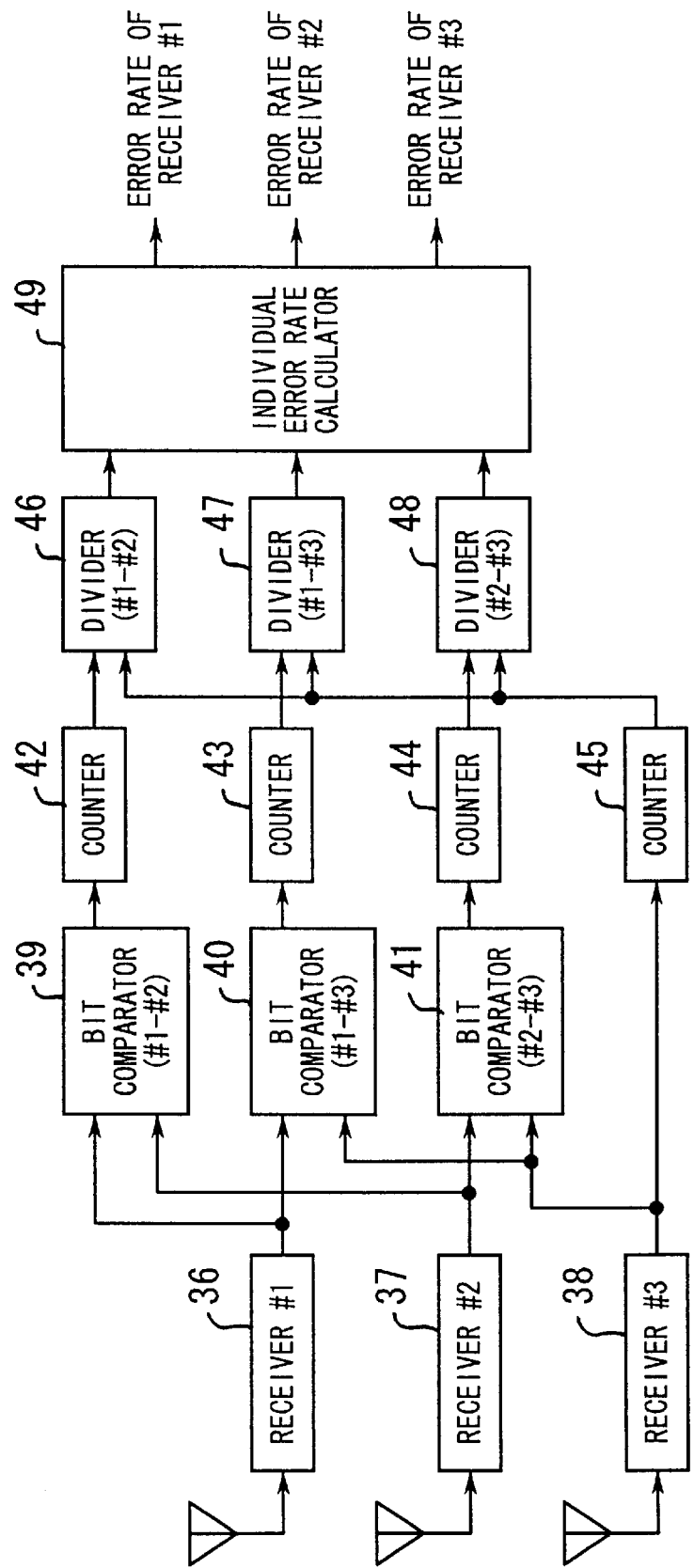
FIG. 9 is a diagram showing the structure of a third embodiment.

Next, a third embodiment of the present invention will be described below with reference to FIG. 9 to show its structure. The third embodiment has three-channel receivers for virtually providing three independent sets of error rate measurement systems, each of which forms basically the same structure as that of the first embodiment.

As to the first set, receivers 36 and 37 in this embodiment correspond to the receivers 11 and 12 in the first embodiment. Likewise, a bit comparator 39 corresponds to the bit comparator 13, counters 42 and 45 to the counters 14 and 15, and a divider 46 to the divider 16.

Similarly, for the second set, receivers 37 and 38 correspond to the receivers 11 and 12, a bit comparator 41 to the bit comparator 13, counters 44 and 45 to the counters 14 and 15, a divider 48 to the divider 16.

Further, for the third set, receivers 38 and 36 correspond to the receivers 11 and 12 in the first embodiment, a bit comparator 40 to the bit comparator 13, counters 43 and 45 to the counters 14 and 15, and a divider 47 to the divider 16.

Each of those three sets operates as the first embodiment does. FIGS. 11(A)–11(C) illustrate their respective error detecting operations. Specifically, FIG. 11(A) shows the output of the divider 46 in the first set, FIG. 11(B) shows the output of the divider 47 in the third set, and FIG. 11(C) shows the output of the divider 48 in the second set.

The outputs from the dividers 46–48 are sent to an individual error rate calculator 49 for calculation of individual error rate in each reception signal received by the receivers 36–38. For explanatory purposes, several variables will be now defined. Bit error rate BER12 is the output of the divider 46 (i.e., the average error rate obtained by observing the reception signals of the receivers 36 and 37). Bit error rate BER13 is the output of the divider 47 (i.e., the average error rate obtained by observing the reception signals of the receivers 36 and 38). Bit error rate BER23 is the output of the divider 48 (i.e., the average error rate obtained by observing the reception signals of the receivers 37 and 38). Then, for the reception signals of the receivers 36, 37, and 38, the respective individual error rates BER1, BER2, and BER3 will be obtained from the following relations.

$$BER12=(BER1+BER2)/2 \qquad (7a)$$

$$BER13=(BER1+BER3)/2 \qquad (7b)$$

$$BER23=(BER2+BER3)/2 \qquad (7c)$$

Equations (7a) to (7c) yield the following equations.

$$BER1=BER12+BER13-BER23 \qquad (8a)$$

$$BER2=BER12+BER23-BER13 \qquad (8b)$$

$$BER3=BER13+BER23-BER12 \qquad (8c)$$

Based on Equations (8a) to (8c), the individual error rate calculator 49 calculates the individual error rate for each reception signal received by the receivers 36–38.

Figure 10:
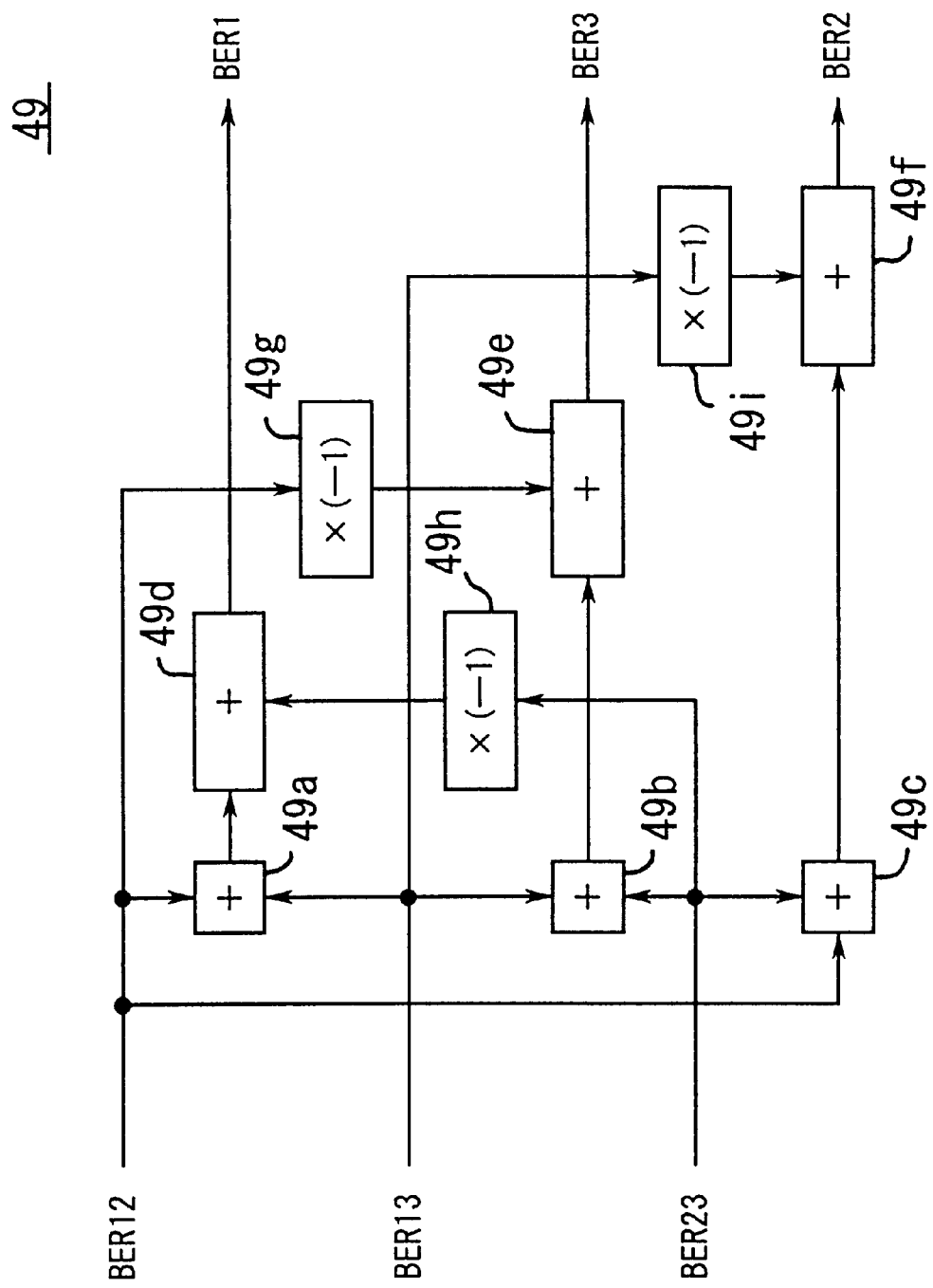
FIG. 10 is a diagram showing the internal structure of an individual error rate calculator.

FIG. 10 shows the internal structure of the individual error rate calculator 49, which implements the above equations (8a) to (8c). Adders 49a–49f output the sum of their two inputs and multipliers 49g–49i change the sign of their input values.

In the above description of the third embodiment, three sets of two-channel reception systems are illustrated. However, the present invention is not restricted to that configuration but can be expanded to four sets or more.

Figure 12:
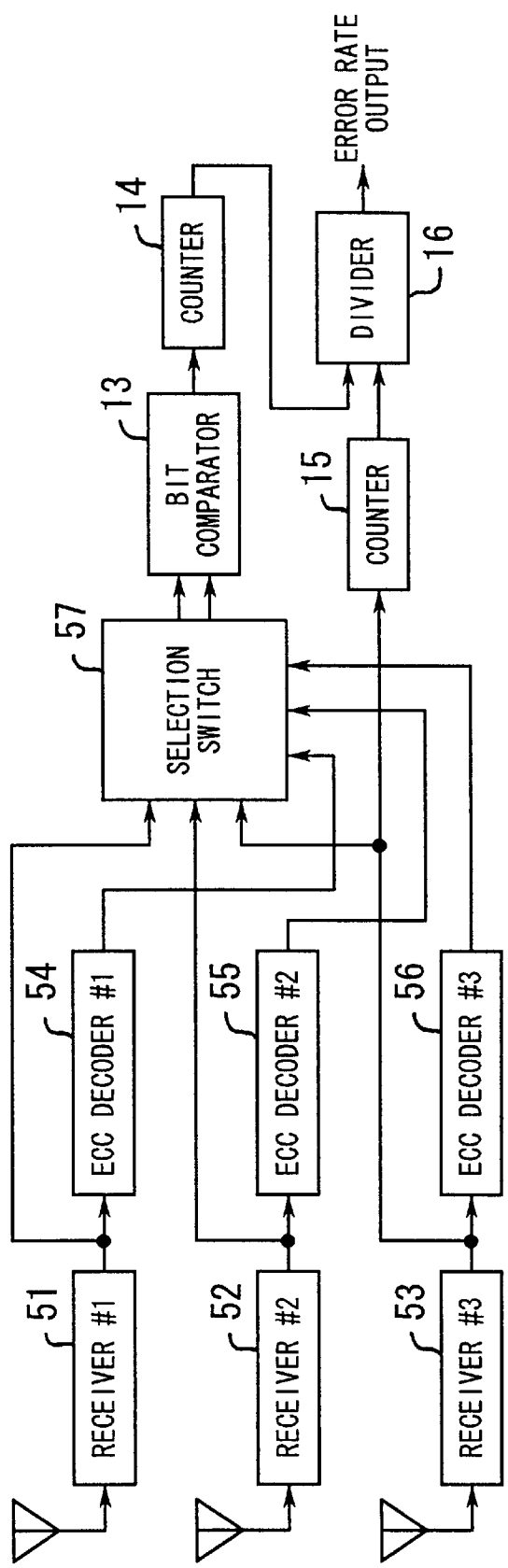
FIG. 12 is a diagram showing the structure of a fourth embodiment.

Next, a fourth embodiment of the present invention will be described below with reference to FIG. 12 to show its structure. This embodiment includes the bit comparator 13, counters 14–15, and divider 16 as the elements common to the first embodiment. The following description will focus on its distinctive points, while maintaining the consistent reference numerals for those common elements.

The fourth embodiment employs three receivers 51–53, three error correction code (ECC) decoders 54–56, and a selection switch 57. In addition to the reception signals from the receivers 51–53, the selection switch 57 receives information that indicates the degree of error correction from the ECC decoders 54–56. The selection switch 57 selects two reception signals that show relatively low frequency of error correction operations, and sends them to the bit comparator 13.

In space diversity, only one reception signal with the highest quality level is selectively outputted to the next stage for processing. Therefore, to obtain the most likely error rate, the measurement should also be targeted at the selected reception signal. The fourth embodiment provides a structural arrangement that allows the error detection circuit to focus on the most adequate reception signals that show low frequency of error correction operations.

Although the fourth embodiment provides a specific case in which the selection switch 57 selects two signals out of three reception signals, it is also possible to expand the system to select two or more signals out of four or more reception signals.

Figure 13:
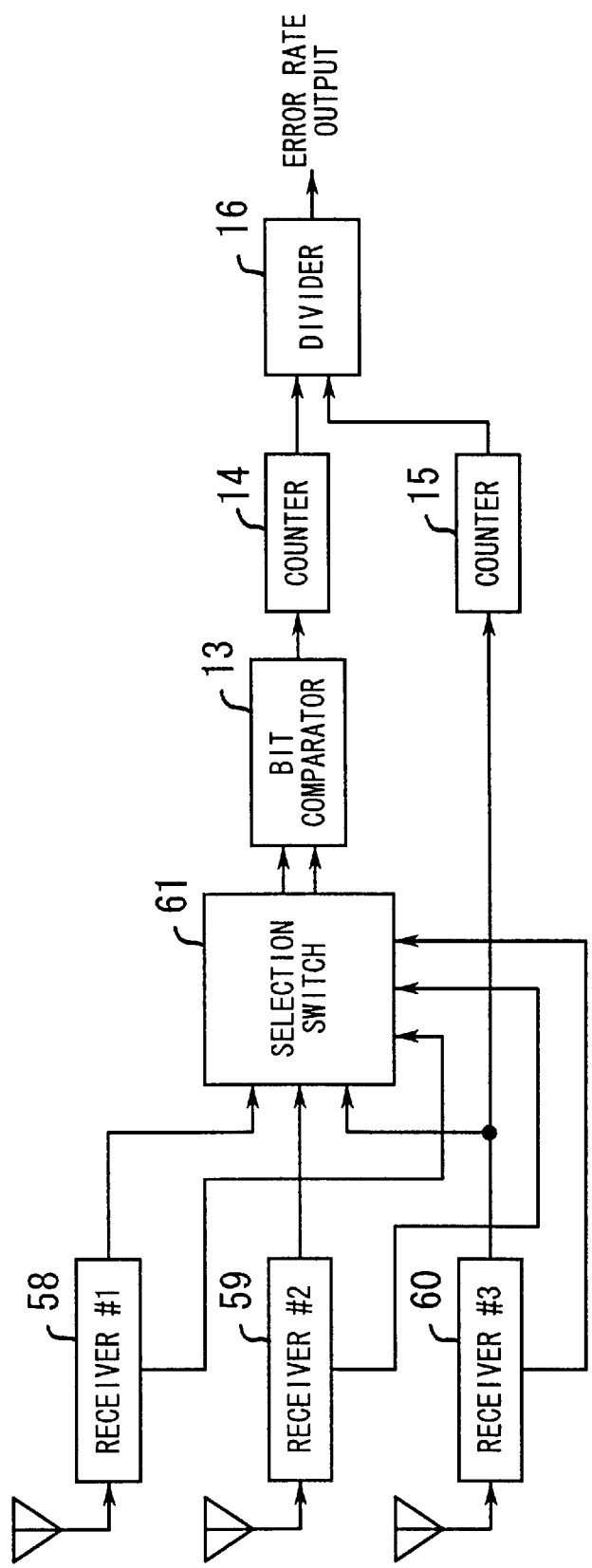
FIG. 13 is a diagram showing a structural arrangement in which receivers are selected according to their reception signal levels.

FIG. 13 shows an alternative configuration for the fourth embodiment. While the selection switch 57 in FIG. 12 selects reception signals according to the degree of error correction, a selection switch 61 in FIG. 13 is provided with reception signal levels from receivers 58–60, in addition to the reception signals. Out of the three reception signals, the selection switch 61 chooses two signals having higher signal levels and sends them to the it comparator 13.

Further, instead of reception signal levels, the amount of phase shift can be an alternative criterion in the signal selection operations. In this case, the selection switch 61 will choose two signals with less phase shift and send them to the bit comparator 13.

Figure 14:
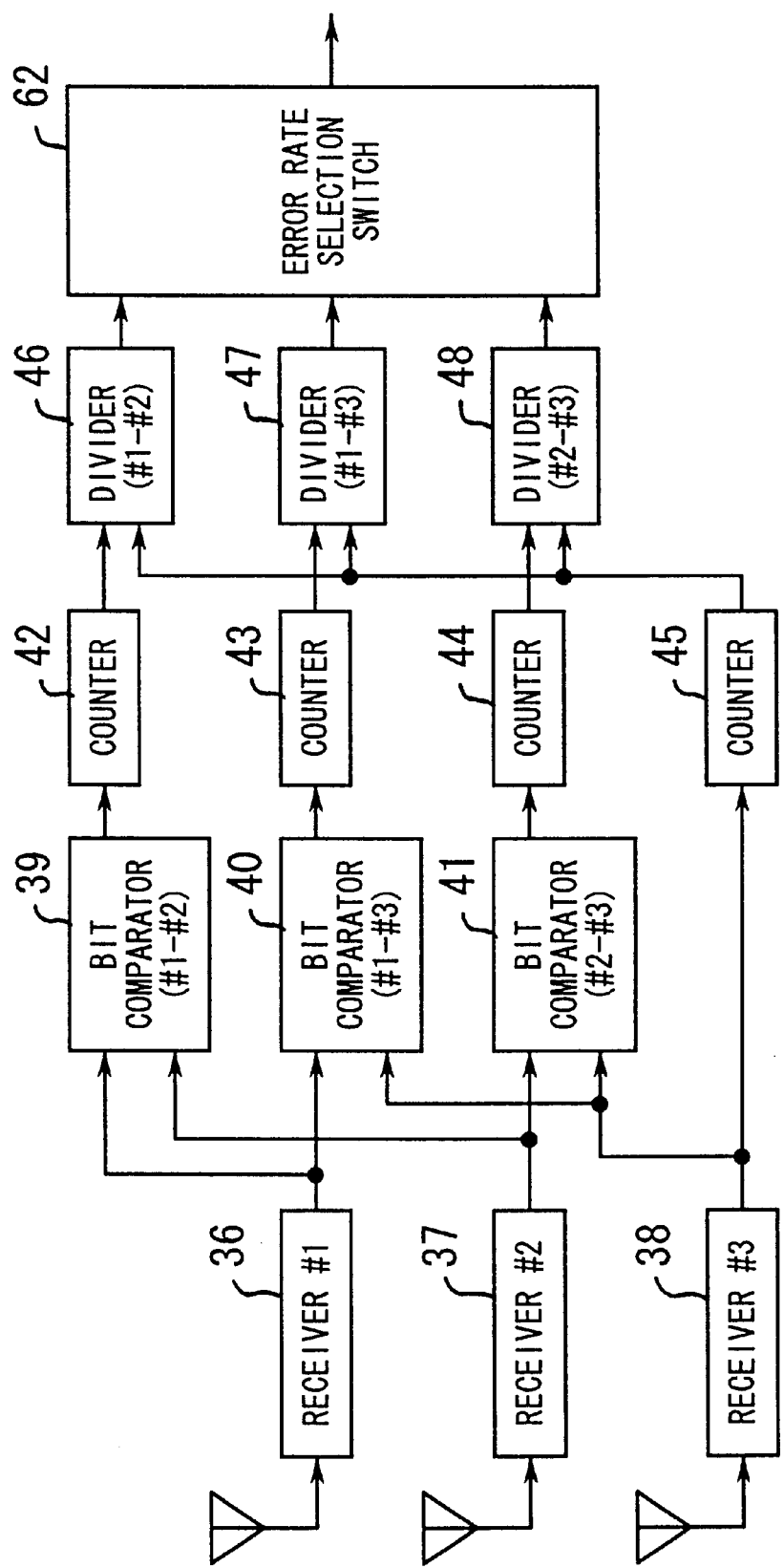
FIG. 14 is a diagram showing a structural arrangement in which the minimum error rate is selected.

FIG. 14 shows another configuration, in which the concept of selection switch of the fourth embodiment is applied to the third embodiment. Since this configuration has basically the same structure as that of the third embodiment shown in FIG. 9, the following description will focus on its distinctive points, while maintaining the consistent reference numerals for the common elements.

In FIG. 14, an error rate selection switch 62 is connected to the dividers 46–48 and receives their respective error rate outputs. The error rate selection switch 62 then selects the lowest error rate among them.

Although FIG. 14 does not explicitly show any diversity combining method, a space diversity technique is used in the present embodiment and it uses only one reception signal having better quality than others for further processing. Therefore, to obtain the most likely error rate, the measurement should also be targeted at the selected reception signal. The configuration shown in FIG. 14 allows the lowest error rate to be selectively outputted.

Next, a fifth embodiment of the present invention will be described below with reference to FIG. 15(A) to show its structure.

In the fifth embodiment, ten receivers 64–66 receive radio waves as part of a 10-channel space diversity receiver system. A bit comparator 67 compares ten reception signals from the receivers 64–66 and sends an error detection pulse to a counter 68 if any one of the ten signals does not meet with the others as shown in FIG. 15(B). The counter 68 counts the number of error detection pulses sent from the bit comparator 67, while another counter 69 counts the number of bits of the reception signal. A timer 71 provides a divider 70 with a calculation start signal at predetermined intervals and, at the same time, resets the counters 68 and 69. Upon reception of the calculation start signal, the divider 70 divides the count value of the counter 68 by that of the counter 69 and further divides the quotient by ten (i.e., the number of reception signals compared by the bit comparator 67), thus obtaining the average error rate.

In general, to yield a reliable and confident result, it is necessary to collect one hundred or more faulty bit samples. This means that the reception signal of $10^5$ bits should be examined when the error rate is $10^{-3}$.

In such error rate measurement, ten times better accuracy, for example, can be easily obtained by simply increasing the number of samples to $10^6$ bits. However, the measurement cycle time will become ten times longer accordingly. The fifth embodiment solves this problem by using ten receivers 64–66 to form a 10-channel reception system, which enables the accuracy to be improved by ten times in the same measurement cycle time and with the same number of samples, i.e., $10^5$ bits.

The above description may be differently interpreted as follows. By using ten receivers 64–66 for verification of the reception signals, the error rate can be measured in one-tenth of the current cycle time, or ten times faster, without degrading the accuracy level.

Next, a sixth embodiment of the present invention will be described below with reference to FIG. 16(A) to show its structure. Since this embodiment has basically the same structure as that of the second embodiment, the following description will focus on its distinctive points, while maintaining the consistent reference numerals for the common elements.

As previously noted, the approximate error rate is expressed as Equation (6), which is obtained from Equation (5) on the assumption that the product term (−2×BERa× BERb) is negligibly small. As opposed to this approach, according to the sixth embodiment, that product term is not neglected but taken into account in the calculation of error rates, thus obtaining more precise results.

In Equation (5), the third term (−2×BERa×BERb) means two times the probability that the two reception signals are both at fault.

Taking this into consideration, the sixth embodiment is configured such that two ECC decoders 33 and 34 send a signal "1" to a correction position comparator 73 when they have performed an error correction operation as shown in FIG. 16(B). The correction position comparator 73 consists of an AND logic gate to generate an error detection pulse #2 when the ECC decoders 33 and 34 simultaneously indicate an error with their respective reception signals that they have decoded. For each error detection pulse #2 from the correction position comparator 73, a multiplier 74 outputs two pulses to a counter 75, thus multiplying the rate of the input pulses. The counter 75 is an up counter that goes up by one for each pulse input from the bit comparator 13 or the multiplier 74. That is, the counter 75 faithfully represents the value of the following equation derived from Equation (5).

$$BERa+BERb=P_{DET}+2\times BERa\times BERb \qquad (9)$$

On the other hand, the counter 15 counts the number of bits of the reception signal. The divider 16 divides the count value of the counter 75 by that of the counter 15 and further divides the quotient by two (i.e., the number of reception signals compared by the bit comparator 13), thus obtaining the average error rate.

In the way described above, the error rate measurement is performed with higher accuracy, since it faithfully implements Equation (9) without neglecting any term.

Although the sixth embodiment has specifically illustrated a two-channel reception system, it can be expanded to n-channel (n=3 or more) systems. In that case, the correction position comparator 73 will generate an error detection pulse #2 only when all of n-channel receivers have indicated errors simultaneously. The multiplier 74 will then provide the counter 75 with n output pulses for each error detection pulse #2 inputted thereto.

The above-described sixth embodiment calculates Equation (9) using the result of error correction. Alternatively, it may be configured to use reception signal levels to do the same. FIG. 17(A) illustrates such an alternative configuration. That is, the signal level comparator 76 compares two reception signal levels in a bit-by-bit manner. An error detection pulse #2 is then generated as shown in FIG. 17(B), when both levels are below a predetermined threshold. Other elements will work as described in the sixth embodiment.

Instead of the reception signal level, the amount of phase shift may be compared bit by bit. In that case, the error detection pulse #2 will be generated when both reception signals show a larger phase shift than a predetermined threshold.

Next, a seventh embodiment of the present invention will be described below with reference to FIG. 18 to show its structure. Since this embodiment has basically the same structure as that of the first embodiment, the following description will focus on its distinctive points, while maintaining the consistent reference numerals for the common elements.

Figure 18:
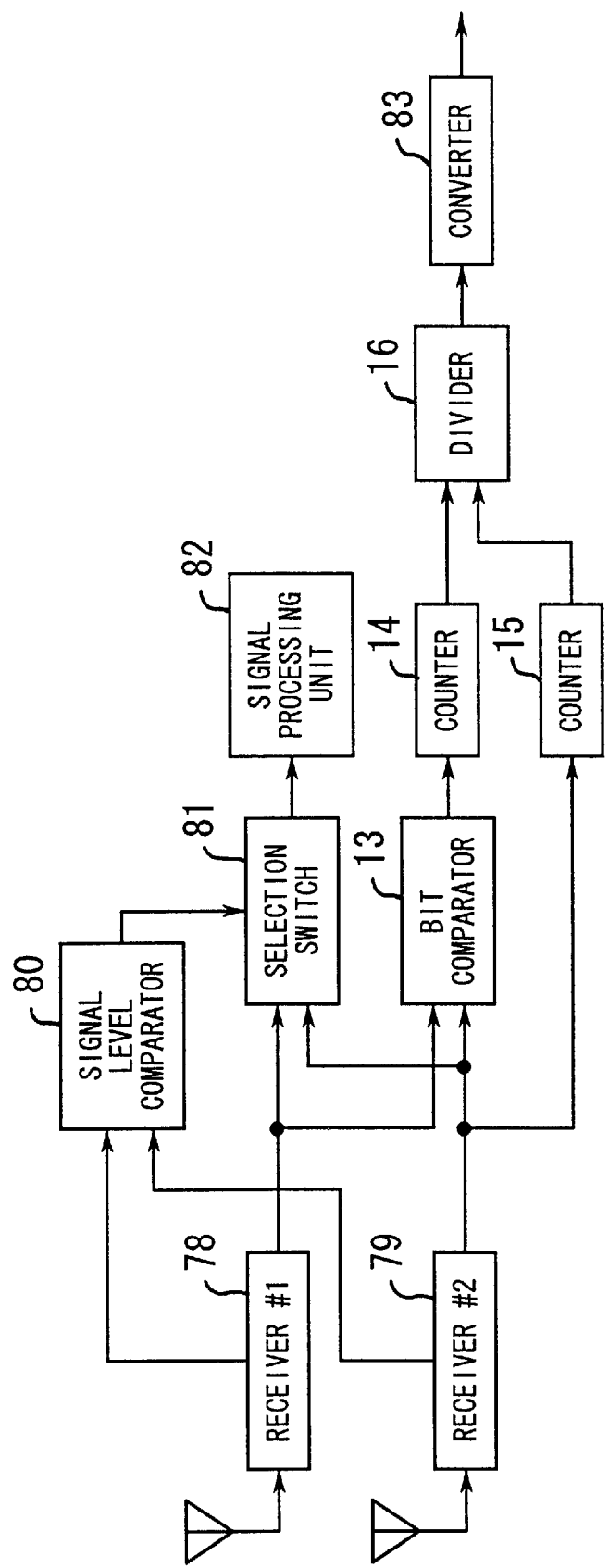
FIG. 18 is a diagram showing the structure of a seventh embodiment.

In addition to the error detection circuits, FIG. 18 illustrates some elements for space diversity. In this two-channel space diversity receiver system, two receivers 78 and 79 provide their respective signal levels to a signal level comparator 80. They also supply demodulated reception signals to a selection switch 81 and bit comparator 13. Comparing the provided signal levels, the signal level comparator 80 notifies the selection switch 81 which channel provides a higher signal level. Then the selection switch 81 selectively sends the appropriate reception signal to a signal processor 82.

The above-described signal level comparator 80, selection switch 81, and signal processor 82 are all common to the embodiments of the present invention that have been discussed so far, although those elements are not shown in the figures or not explained in the description.

The diversity receiver system in FIG. 18 has only two diversity channels and uses a simple selection combining method that selects either one of the two channels. For further enhancement, the system may be configured to have three or more diversity channels. This increased channels will allow a plurality of reception signals to be selected and summed up for more appropriate diversity combining.

Figure 19:
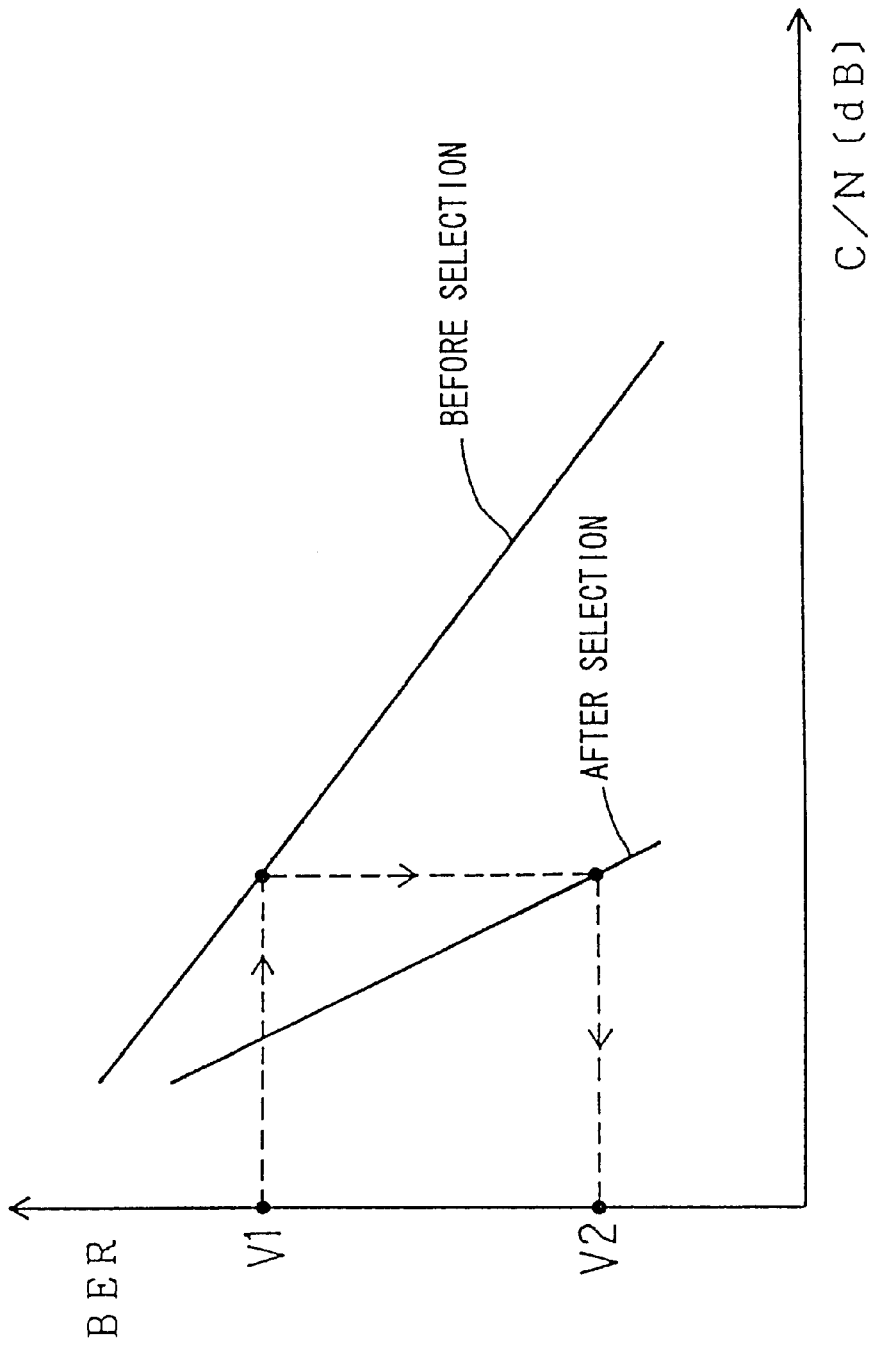
FIG. 19 is a diagram showing a relation between an error rate before selection and an error rate after selection.

Another point of interest in the seventh embodiment is a converter 83 disposed at the output of the divider 16. With this converter 83 along with a conversion table as will be described later, an average error rate obtained by the divider 16 is translated from the value before diversity selection to the value after diversity selection. This conversion is necessary because the error rate should be calculated taking the effect of diversity selection into consideration, when a simple selection combining method is incorporated in the system. More specifically, FIG. 19 shows a relation between error rate before selection and error rate after selection. The converter 83 has a conversion table that represents this relation for use in the conversion from the error rate V1 obtained before selection to the error rate V2 after selection.

Figure 20:
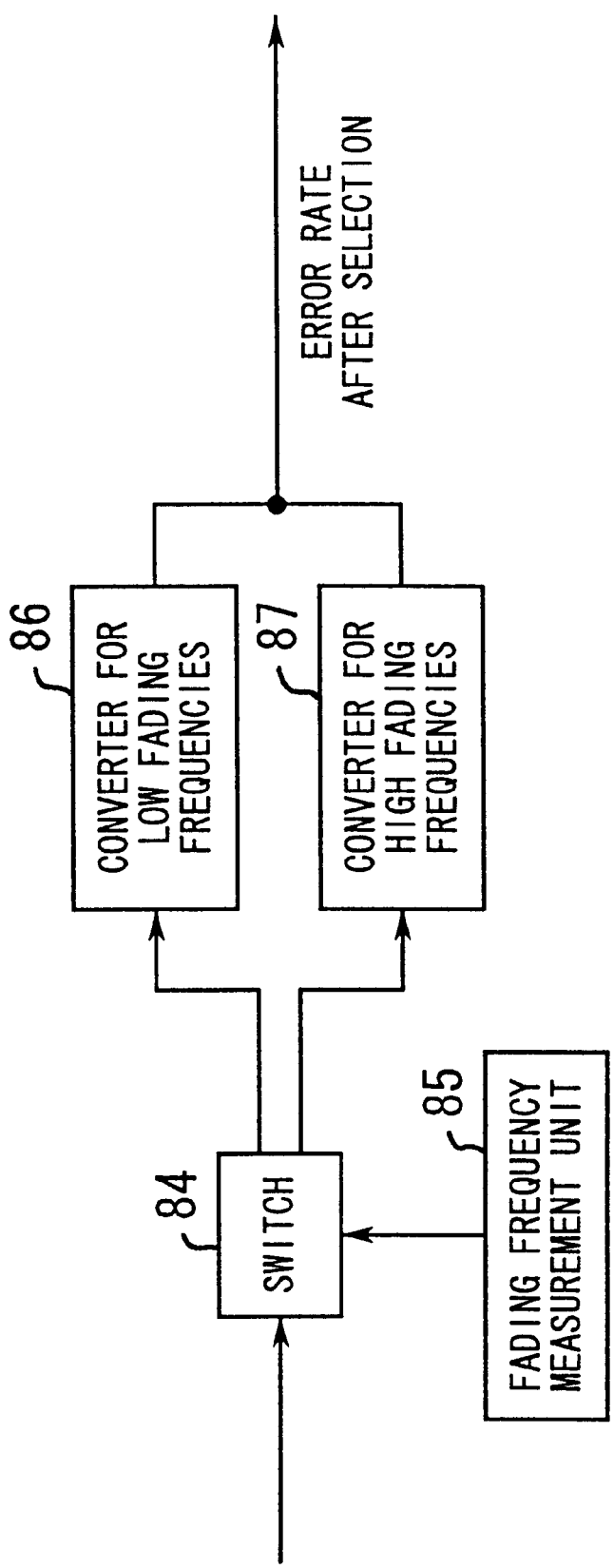
FIG. 20 is a diagram showing another structural arrangement of a converter.

More sophisticated conversion will be required under the conditions that the radio signals are suffered from fading. In this case, the error rate after diversity selection varies depending on the rate of the fading. To make the measurement be adaptive to this variation, the converter 83 is arranged as shown in FIG. 20.

In this arrangement, the fading frequency is first measured by a fading frequency measurement unit 85. Through a switch 84, the average error rate from the divider 16 is distributed to either a converter 86 for low frequency fading or a converter 87 for high frequency fading, depending on the measured fading frequency.

Figure 21:
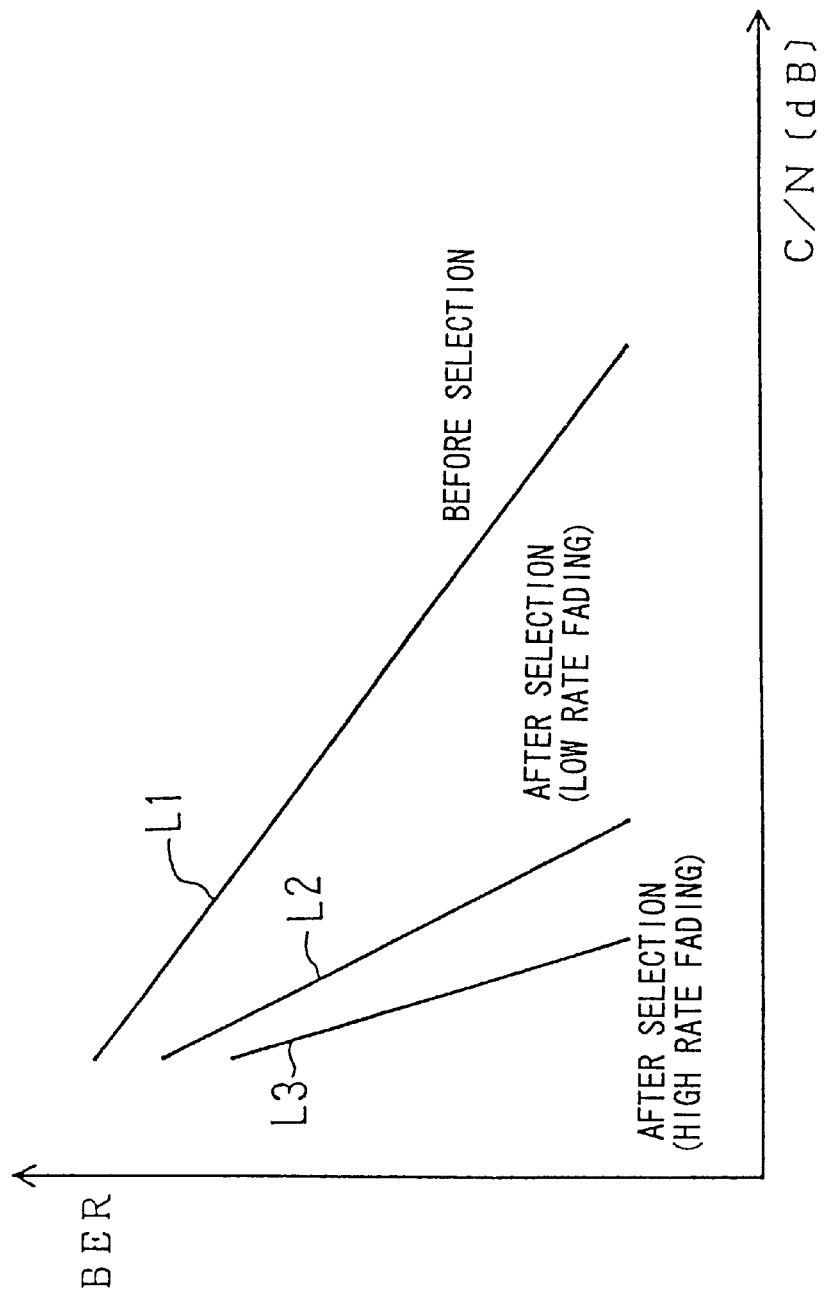
FIG. 21 is a diagram showing a conversion of the error rate after selection according to a fading rate.

FIG. 21 shows the function of those converters. The converter 86 for low frequency fading has a table containing data for the straight lines L1 and L2, which indicate the error rates before selection and after selection, respectively. Likewise, the converter 87 for high frequency fading has a table containing data for the straight lines L1 and L3, which indicate the error rates before selection and after selection, respectively. The error rate after selection is determined according to those tables.

Figure 22:
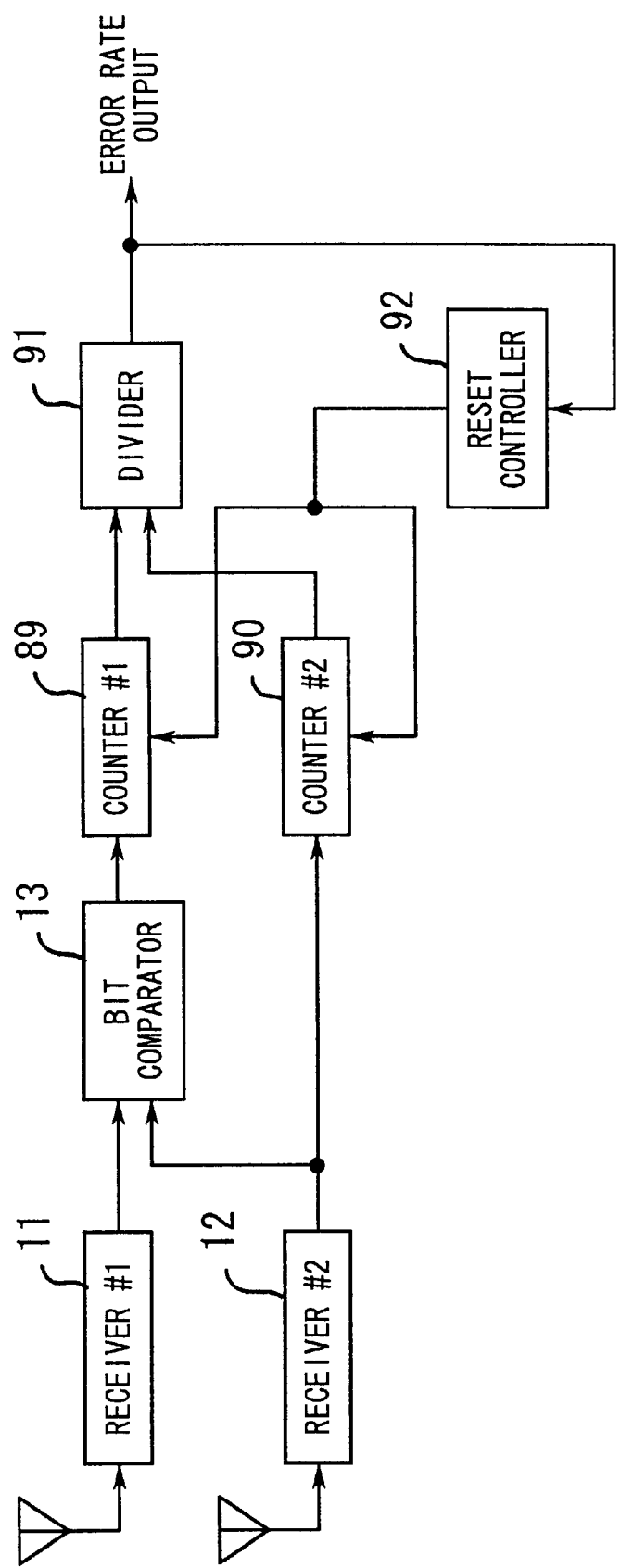
FIG. 22 is a diagram showing the structure of an eighth embodiment.

Next, an eighth embodiment of the present invention will be described below with reference to FIG. 22 to show its structure. Since this embodiment has basically the same structure as that of the first embodiment, the following description will focus on its distinctive points, while maintaining the consistent reference numerals for the common elements.

In the eighth embodiment, a reset controller 92 sends a reset signal to counters 89 and 90 to set their values to zero, each time the error rate is outputted from a divider 91. The divider 91 monitors the value of the counter 90 which counts the number of received bits. Upon detection of the count value having reached, say, $10^5$ bits, the divider 91 divides the value of the counter 89 by this count $10^5$ and further divides the quotient by two (i.e., the number of reception signals subjected to the bit comparator 13), thus obtaining the average error rate. As an alternative method to initiate the above calculation, the divider 91 may employ a timer to measure the time T taken for receiving $10^5$ bits.

FIG. 23(A) illustrates the operation of the above-described system. This chart specifically shows how the divider 91 outputs the measurement results of $10^{-3}$, $5 \times 10^{-3}$, and $3 \times 10^{-5}$ at fixed intervals T.

The configuration of this embodiment can be modified so that the divider 91 will monitor the counter 89 instead of the counter 90 to obtain a timing for triggering the calculation of average error rate. For example, upon detection of the count of faulty bits in the counter 89 having reached $10^2$ bits, the divider 91 divides this count $10^2$ by the value of the counter 90 and further divides the quotient by two (i.e., the number of reception signals subjected to the bit comparator 13), thus obtaining the average error rate.

FIG. 23(B) illustrates the operation of this modified configuration, in which the measured error rates $10^{-3}$, $2 \times 10^{-3}$, $10^{-4}$ are outputted from the divider 91 at different intervals. Because the calculation starts when the number of faulty bits has reached a fixed number $10^2$, the accuracy of the measurement is maintained at a constant level.

Figure 24:
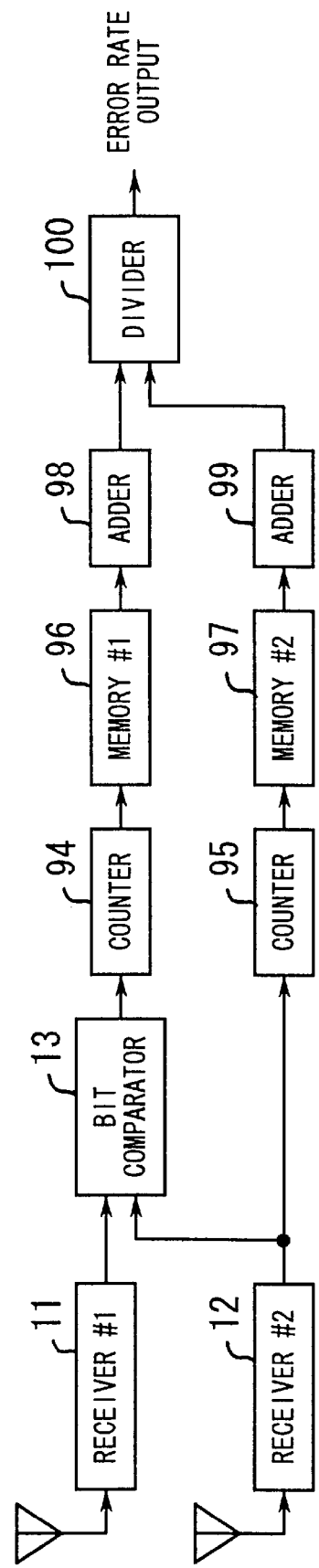
FIG. 24 is a diagram showing the structure of a ninth embodiment.

Next, a ninth embodiment of the present invention will be described below with reference to FIG. 24 to show its structure. Since this embodiment has basically the same structure as that of the first embodiment, the following description will focus on its distinctive points, while maintaining the consistent reference numerals for the common elements.

In the ninth embodiment, a counter 94 provides its count output to a memory 96 and resets itself to zero at every one-tenth of a predetermined interval T. Similarly to the counter 94, a counter 95 provides its count output to a memory 97 and resets itself to zero at every one-tenth of the interval T. The memories 96 and 97 have ten storage locations for receiving count values from the counters 94 and 95, respectively. Those storage areas will work just as shift registers in which the contents are shifted to the next stage every time a new entry is entered therein from the counters 94 and 95.

Figure 25:
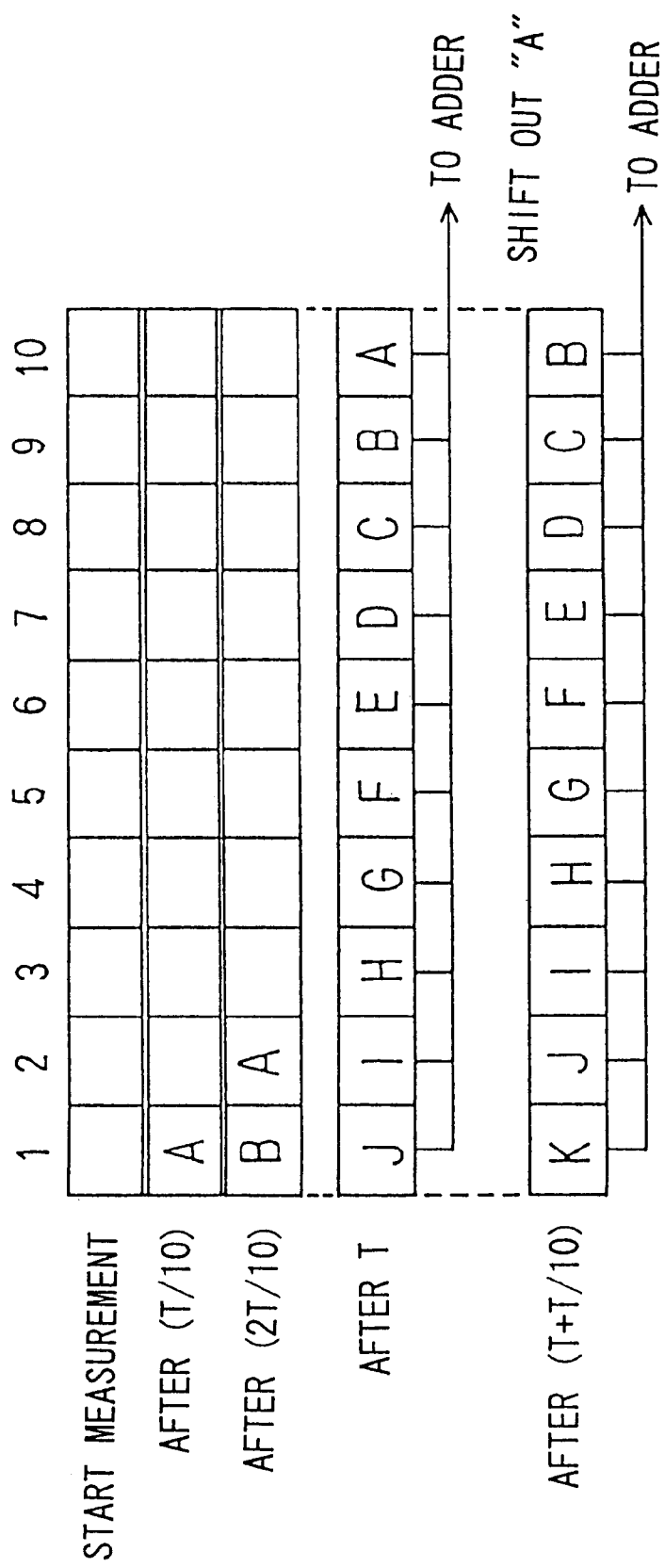
FIG. 25 is a diagram showing how sample data is stored in a memory.

FIG. 25 shows how the count values will be stored in the above-described storage locations. At first, all the ten locations are cleared before starting the error rate measurement. After one-tenth of the given interval T, or at the time T/10, a count value "A" is entered to the first location, and at the time 2T/10, the next entry of the count value "B" is loaded to the first location and the previous count value "A" is shifted to the second location. At the time T, a new count value "J" is entered to the first location and the contents of the other storage locations are shifted in the right direction. The first and second entries "A" and "B" are now in the ninth and tenth locations and all the storage locations are filled with the count values. At the time (T+T/10), another count value "K" is entered to the first location, and the other storage locations are shifted in the right direction. The count value "B" is now in the tenth location and the count value "A" is removed therefrom.

Returning to FIG. 24, an adder 98 calculates the sum of the count values stored in the entire storage area of the memory 96 and then sends the sum to a divider 100. Likewise, an adder 99 calculates the sum of the count values stored in the entire storage area of the memory 97 and sends the sum to the divider 100. The divider 100 divides the sum obtained from the adder 98 by the sum obtained from the adder 99, and further divides the quotient by two (i.e., the number of reception signals compared by the bit comparator 13), thus obtaining the average error rate. All the above-described operations of the adders 98 and 99 and the divider 100 are initiated upon elapse of time T and repeated at intervals of T/10.

Figure 26:
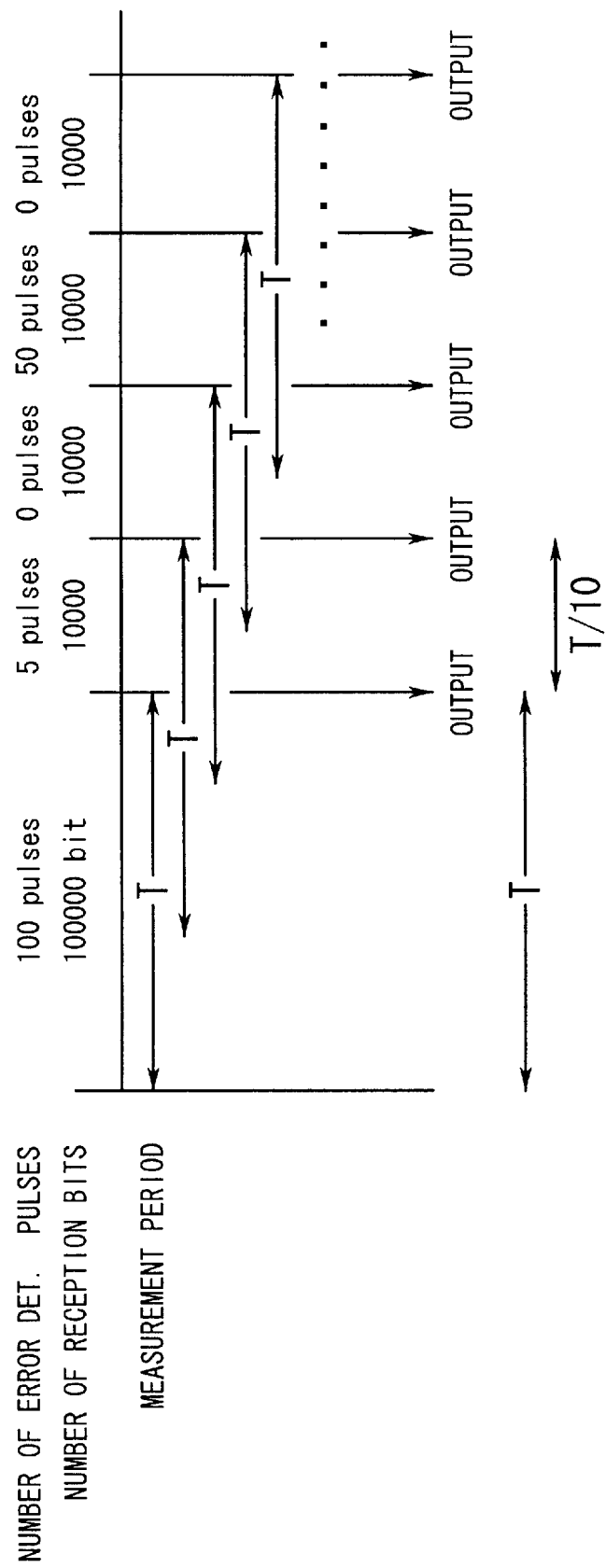
FIG. 26 is a diagram showing output timings of the error rate.

Therefore, as shown in FIG. 26, the first calculation result will be outputted at the time T, but the further results will be obtained at T/10 intervals, where T is a time required for signal reception of $10^5$ bits. Note that every error rates outputted at T/10 intervals are based on the signals received during the period of T. Therefore, the error rate can be obtained at a higher rate without degrading the accuracy.

In the above-described configuration, the predetermined time T is divided by ten, and ten storage locations are reserved in the memories 96 and 97. However, the factor of time division and the number of storage locations are not restricted to ten but can be any other integer number n.

Figure 27:
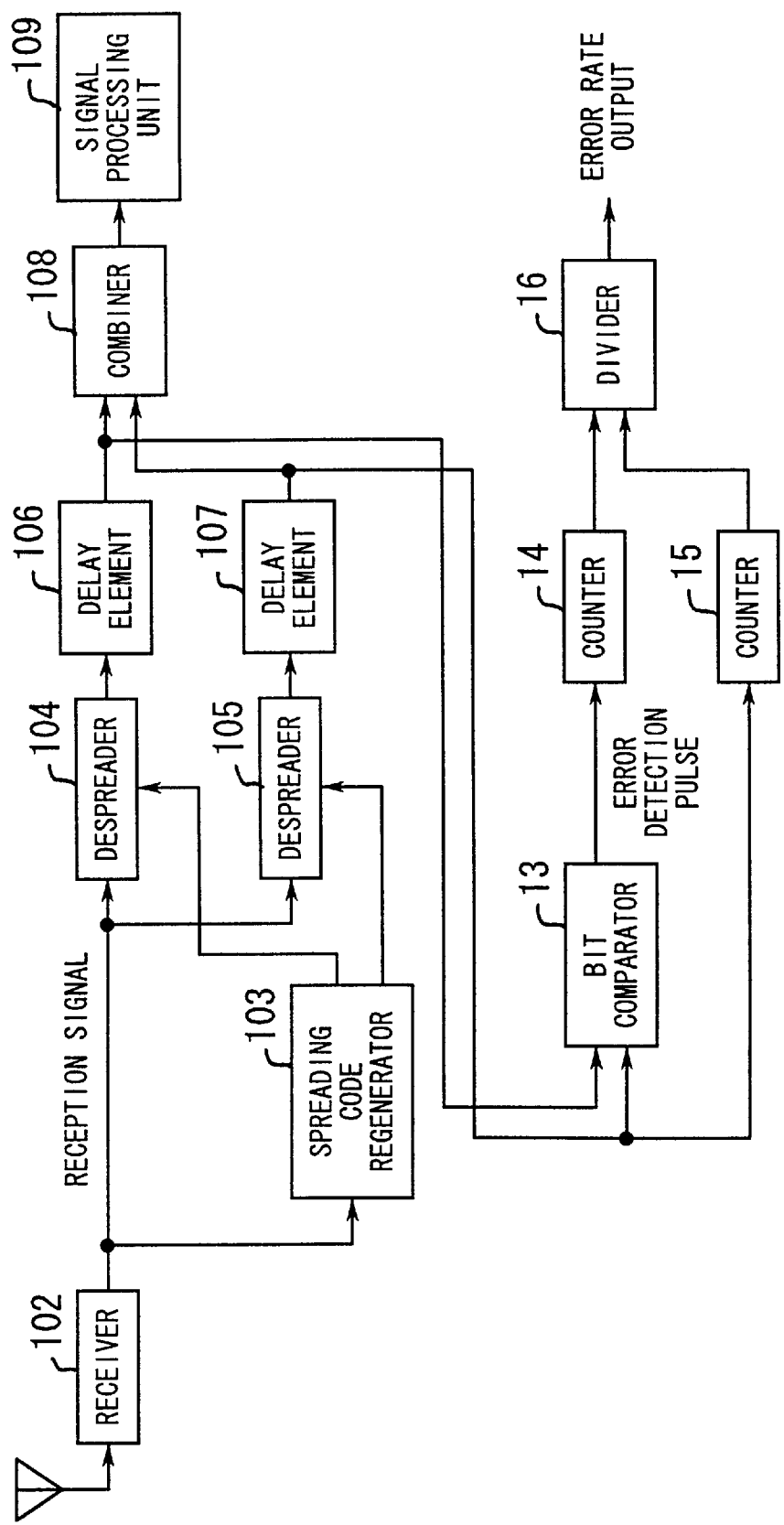
FIG. 27 is a diagram showing the structure of a tenth embodiment.

Next, a tenth embodiment of the present invention will be described below with reference to FIG. 27 to show its structure. Since this embodiment has basically the same structure as that of the first embodiment, the following description will focus on its distinctive points, while maintaining the consistent reference numerals for the common elements.

In the tenth embodiment, a receiver 102 receives a radio signal and two despreaders 104 and 105 despread the received signal synchronizing therewith. Spreading code signals are provided to the despreaders 104 and 105 from a spreading code regenerator 103. The despreaded data outputs are then cophased by delay elements 106 and 107, combined by a combiner 108, and supplied to a signal processing unit 109. Note that the receiver 102, despreaders 104 and 105, and spreading code regenerator 103 constitute a CDMA communication scheme, and the delay elements 106 and 107 and the combiner 108 constitute a RAKE receiver system.

The tenth embodiment shows that the present invention can also be applied to such a receiver using CDMA and RAKE techniques. That is, the bit comparator 13 compares the outputs of the delay elements 106 and 107.

Figure 28:
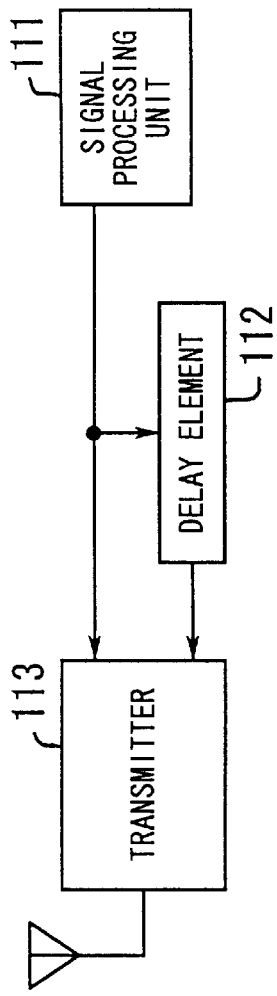
FIG. 28(A) is a diagram showing the structure of a transmitter in an eleventh embodiment.
FIG. 28(B) is a diagram showing the structure of a receiver in the eleventh embodiment.
Figure 28:
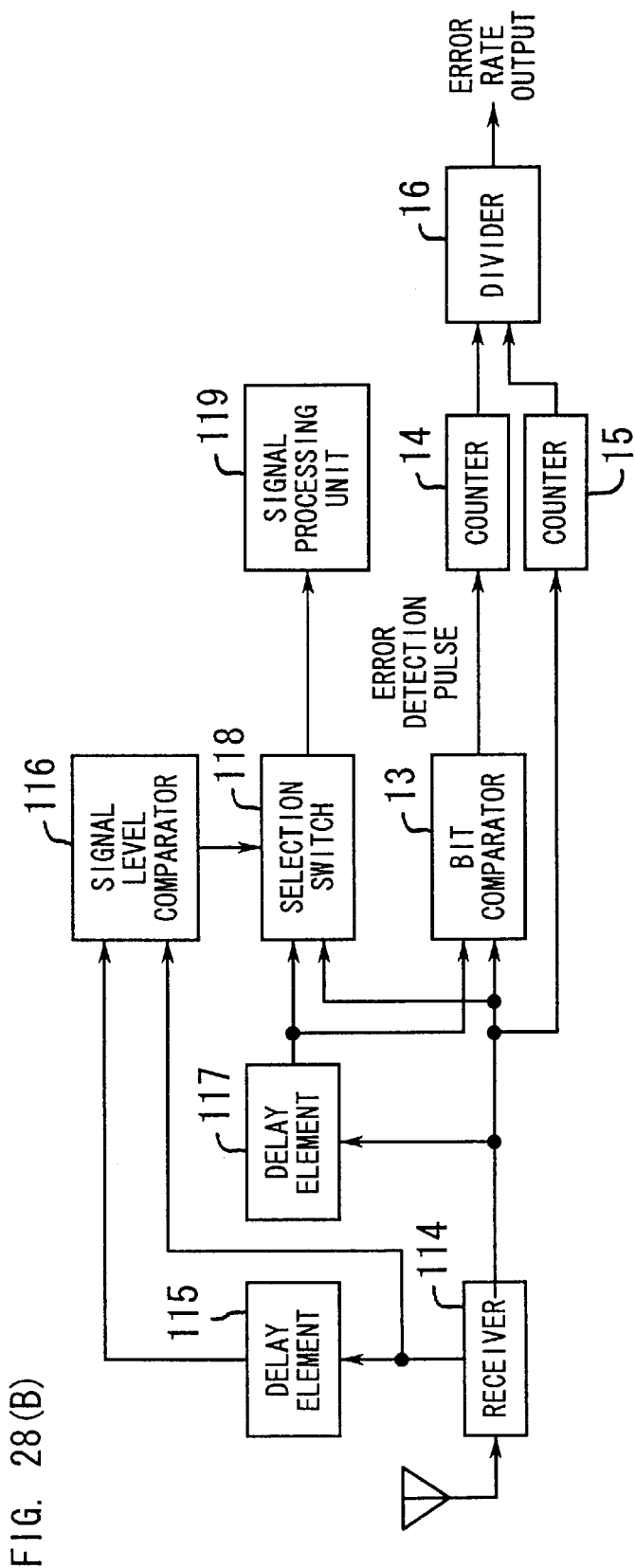
Figure 29:
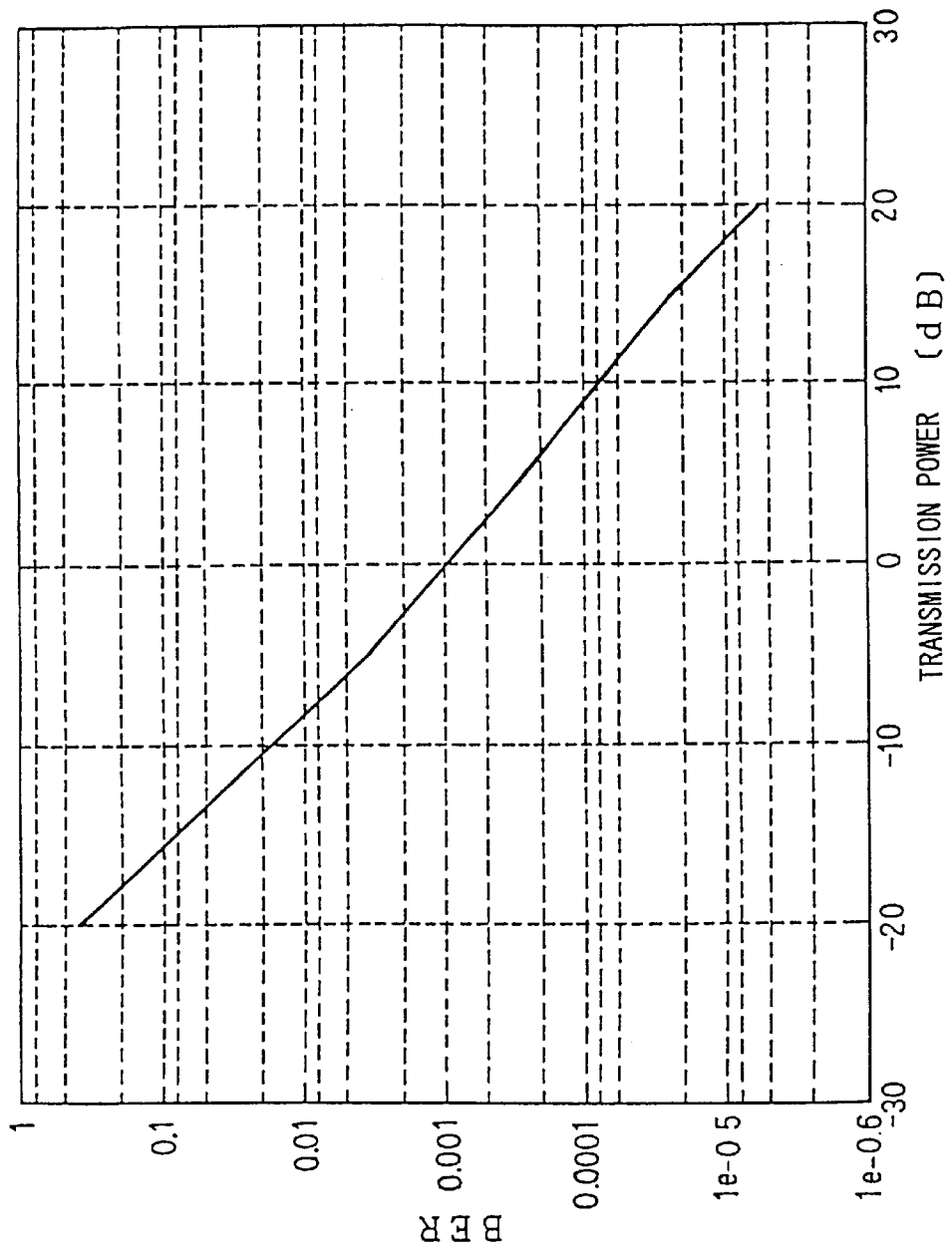
FIG. 29 is a graph showing error rate of reception signals versus transmission power.
Figure 30:
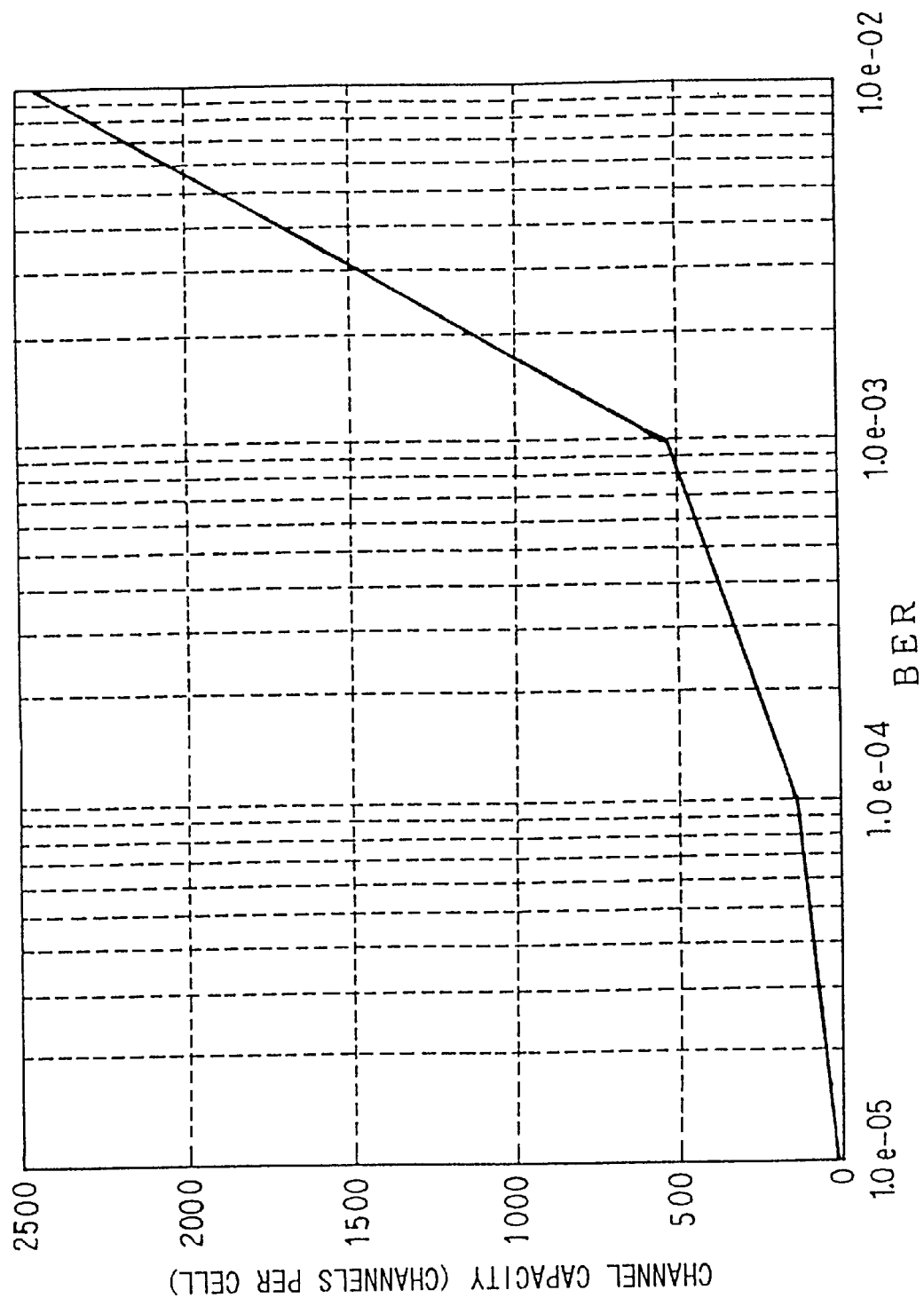
FIG. 30 is a graph showing channel capacity versus error rate of reception signals.

Next, an eleventh embodiment of the present invention will be described below with reference to FIGS. 28(A) and 28(B) to show the structure of its transmitter unit and receiver unit, respectively. Since this embodiment has basically the same structure as that of the first embodiment, the following description will focus on its distinctive points, while maintaining the consistent reference numerals for the common elements.

In the transmitter unit of the eleventh embodiment, a signal processing unit 111 provides a transmitter 113 with a transmission signal and its replica that is delayed by a delay element 112. With this configuration, the same transmission signal will be transmitted twice with a certain time interval.

In the receiver unit, a receiver 114 receives such duplicated transmission signals and supplies them to a delay element 117. Since the delay element 117 has the same time constant as that of the delay element 112 in the transmitter, the first-arrived signal will be cophased with the second-arrived signal, thus obtaining two cophased reception signals. Similarly, two cophased reception level signals are obtained with a delay element 115. A signal level comparator 116 compares these reception level signals and notifies which reception signal has a higher level. Based on this notification, a selection switch 118 chooses the best reception signal for use in a signal processing unit 119.

The eleventh embodiment shows that the present invention can be applied to such a time diversity receiver system, by delivering the outputs of the receiver 114 and delay element 117 to the bit comparator 13.

The above discussion will be summarized as follows. According to the present invention, a plurality of receivers receive multipath propagation signals that have differently suffered from path-related transmission errors. A bit comparator makes a bit-to-bit comparison to detect bit errors, thereby obtaining an error rate of the reception signals. Unlike the prior art that uses a frame synchronization pattern, the subject of the comparison is not a limited portion but the whole frame of incoming signals. Therefore, the measurement can be done in a short cycle time. Further, since the reception signals to be compared are digital signals, a precise result can be obtained with a simple measurement device.

In conclusion, the error rate measurement apparatus according to the present invention will enhance the performance of mobile communications equipment which is used under the conditions that the error rate is widely varied.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An error rate measurement apparatus for detecting an error rate of received signals on a real-time basis in a radio communications system, comprising:

a reception means for receiving signals from a single transmission source through propagation paths differing from each other;

comparison means for making a comparison of reception signals received by said reception means;

error rate calculation means for obtaining an error rate from a result of said comparison made by said comparison means.

2. An error rate measurement apparatus according to claim 1, wherein said comparison means comprises means for comparing said reception signals bit by bit, and said error rate calculation means comprises means for obtaining a bit error rate.

3. An error rate measurement apparatus according to claim 1, wherein said comparison means comprises means for comparing said reception signals symbol by symbol, and said error rate calculation means comprises means for obtaining a symbol error rate.

4. An error rate measurement apparatus according to claim 1, wherein said comparison means comprises means for comparing said reception signals block by block, and said error rate calculation means comprises means for obtaining a block error rate.

5. An error rate measurement apparatus according to claim 1, wherein each of said reception means comprises decoding means for decoding an error correction code, and said comparison means compares said reception signals after decoding by said decoding means.

6. An error rate measurement apparatus according to claim 1, wherein
   said comparison means comprises means for creating all possible combinations of two reception signals selected out of said reception signals and making a comparison between the two reception signals of each combination, and
   said error rate calculation means comprises means for obtaining an error rate of each of said reception signals, based on results of said comparison for the respective combinations performed by said comparison means.

7. An error rate measurement apparatus according to claim 1, wherein
   said comparison means comprises means for making an overall comparison of said reception signals at a time, and
   said error rate calculation means comprises means for obtaining an average error rate of said reception signals from a result of said overall comparison.

8. An error rate measurement apparatus to claim 1, further comprising a plurality of decoding means corresponding to the respective reception signals for decoding error correction codes in the respective receptions signals received by said reception means,
   wherein said comparison means compares two or more reception signals whose corresponding decoding means indicate the lowest error correction rates among said reception signals.

9. An error rate measurement apparatus according to claim 1, further comprising reception condition monitoring means for monitoring reception conditions of the respective reception signals in said reception means,
   wherein said comparison means selectively compares two or more reception signals whose reception conditions are regarded as being good by said reception condition monitoring means.

10. An error rate measurement apparatus according to claim 1, wherein
    said comparison means comprises
       means for creating all possible combinations of two reception signals selected out of said reception signals and making a comparison between the two reception signals of each combination, and
    said error rate calculation means comprises
       individual error rate calculation means for obtaining average error rates of said combinations of said reception signals, based on results of said comparison for the respective combinations performed by said comparison means, and
       output means for outputting the lowest error rate among said average error rates obtained by said individual error rate calculation means.

11. An error rate measurement apparatus according to claim 1, wherein
    said comparison means comprises means for making an overall comparison of said reception signals at a time, and
    said error rate calculation means comprises means for obtaining an average error rate of said reception signals from a result of said overall comparison at predetermined intervals.

12. An error rate measurement apparatus according to claim 1, further comprising a plurality of decoding means corresponding to the respective reception signals for decoding error correction codes in the respective reception signals received by said reception means, wherein
    said comparison means comprises
       means for comparing said reception signals bit by bit, and
    said error rate calculation means comprises
       counting means for increasing an error count value by one each time said comparison means detects a bit error and increasing said error count value by the number of reception signals compared by said comparison means each time said plurality of decoding means corrects errors that have happened to all of said reception signals at a time, and
       means for obtaining the error rate based on said error count value.

13. An error rate measurement apparatus according to claim 1, further comprising reception condition monitoring means for monitoring reception conditions of said reception signals received by said reception means, wherein
    said comparison means comprises
       means for comparing said reception signals bit by bit, and
    said error rate calculation means comprises
       counting means for increasing an error count value by one each time said comparison means detects a bit error and increasing said error count value by the number of reception signals compared by said comparison means each time said reception condition monitoring means observes bad reception conditions concerning all of said reception signals at a time, and
       means for obtaining the error rate based on said error count value.

14. An error rate measurement apparatus according to claim 1, further comprising
    diversity means for performing space diversity using said reception signals received by said reception means, and
    conversion means for converting said error rate obtained by said error rate calculation means to an error rate after diversity combining.

15. An error rate measurement apparatus according to claim 14, wherein said converting means comprises a conversion table and converts said error rate adaptively to fading rate by using said conversion table.

16. An error rate measurement apparatus according to claim 1, wherein
    said comparison means comprises
       means for comparing said reception signals bit by bit, and
    said error rate calculation means comprises
       faulty bit counting means for counting the number of faulty bits detected by said comparison means as bit errors,
       incoming bit counting means for counting the number of incoming bits on said reception signals, and
       calculation means for calculating said error rate by dividing the number of faulty bits by the number of incoming bits, and further dividing a quotient thereof by the number of reception signals that are compared by said comparison means.

17. An error rate measurement apparatus according to claim 16, wherein
    said calculation means comprises
       means for calculating said error rate when the number of incoming bits counted by said incoming bit counting means has reached a predetermined number, and
    said error rate calculation means further comprises
       resetting means for resetting said faulty bit counting means and said incoming bit counting means when said calculation means has outputted said error rate.

18. An error rate measurement apparatus according to claim 1, wherein
said calculation means comprises
means for calculating said error rate when the number of faulty bits counted by a faulty bit counting means has reached a predetermined number, and
said error rate calculation means further comprises
resetting means for resetting said faulty bit counting means and an incoming bit counting means when said calculation means has outputted said error rate.

19. An error rate measurement apparatus according to claim 1, wherein
said comparison means comprises
means for comparing said reception signals bit by bit, and
said error rate calculation means comprises
faulty bit counting means for counting the number of faulty bits that are detected by said comparison means, for a predetermined period,
incoming bit counting means for counting the number of incoming bits on said reception signals for said predetermined period,
faulty bit count storage means having a predetermined number of storage locations for successively storing the number of faulty bits counted by said faulty bit counting means in a first-in first-out manner,
incoming bit count storage means having the predetermined number of storage locations for successively storing the number of faulty bits outputted by said faulty bit counting means in a first-in first-out manner,
faulty bit count summation means for summing up values stored in said faulty bit count storage means at intervals of the predetermined period,
incoming bit count summation means for summing up values stored in said incoming bit count storage means at intervals of the predetermined period,
calculation means for calculating said error rate by dividing the number of faulty bits by the number of incoming bits, and further dividing a quotient thereof by the number of reception signals that are compared by said comparison means.

20. An error rate measurement apparatus for detecting an error rate of signals received via multiple propagation paths on a real-time basis in a spread-spectrum radio communications system, the error rate measurement apparatus comprising:
a plurality of despreading means for despreading a reception signal;
a plurality of delaying means for delaying respective outputs of said plurality of despreading means;
combining means for combining respective outputs of said plurality of delaying means;
comparison means for making a comparison of said respective outputs of said plurality of delaying means; and
error rate calculation means for obtaining an error rate from a result of said comparison performed by said comparison means.

21. An error rate measurement apparatus for detecting an error rate of signals received via multiple propagation paths in a time diversity radio communications system where the signals are transmitted at two instants separated by a prescribed time, the error rate measurement apparatus comprising:
delaying means for delaying a reception signal by the prescribed time to produce a delayed reception signal;
diversity combining means for combining said reception signal and said delayed reception signal according to a time diversity method;
comparison means for making a comparison between said reception signal and said delayed reception signal; and
error rate calculation means for obtaining an error rate from a result of said comparison performed by said comparison means.

* * * * *